United States Patent
Kiyotani et al.

(10) Patent No.: US 12,533,614 B2
(45) Date of Patent: *Jan. 27, 2026

(54) AIR FILTER MEDIUM, PLEATED FILTER MEDIUM, AIR FILTER UNIT, MASK FILTER MEDIUM, AND METHOD FOR REGENERATING AIR FILTER MEDIUM

(71) Applicant: DAIKIN INDUSTRIES, LTD., Osaka (JP)

(72) Inventors: Hideyuki Kiyotani, Osaka (JP); Kunihiko Inui, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/525,085

(22) Filed: Nov. 30, 2023

(65) Prior Publication Data

US 2024/0091688 A1    Mar. 21, 2024

Related U.S. Application Data

(63) Continuation of application No. PCT/JP2022/022497, filed on Jun. 2, 2022.

(30) Foreign Application Priority Data

Jun. 4, 2021  (JP) ................... 2021-094637

(51) Int. Cl.
  *B01D 39/16*   (2006.01)
  *B01D 46/52*   (2006.01)
  (Continued)

(52) U.S. Cl.
  CPC ........... *B01D 39/16* (2013.01); *B01D 46/521* (2013.01); *B01D 65/06* (2013.01); *B01D 71/36* (2013.01); *B01D 71/48* (2013.01)

(58) Field of Classification Search
  None
  See application file for complete search history.

(56) References Cited

U.S. PATENT DOCUMENTS

| | | | |
|---|---|---|---|
| 2013/0025245 A1* | 1/2013 | Healey | B01D 63/14 |
| | | | 55/497 |
| 2015/0013295 A1 | 1/2015 | Uchiyama et al. | |
| | (Continued) | | |

FOREIGN PATENT DOCUMENTS

| | | |
|---|---|---|
| CN | 111269621 A | 6/2020 |
| CN | 111424360 A | 7/2020 |
| | (Continued) | |

OTHER PUBLICATIONS

International Preliminary Report on Patentability and English translation of the Written Opinion of the International Searching Authority for International Application No. PCT/JP2022/022497, dated Dec. 14, 2023.

(Continued)

*Primary Examiner* — Krishnan S Menon
(74) *Attorney, Agent, or Firm* — BIRCH, STEWART, KOLASCH & BIRCH, LLP

(57) ABSTRACT

An air filter medium includes a fluororesin porous membrane and a supporting member stacked on top of each other. The air filter medium has a permeability ratio (permeability after disinfection treatment/permeability before disinfection treatment) of 5.0 or less, the permeability ratio being a ratio of permeabilities of the air filter media before and after the disinfection treatment of the fluororesin porous membrane as determined using NaCl particles having a particle size of 0.1 μm, and a pressure loss ratio (pressure loss after disinfection treatment/pressure loss before disinfection treatment) of 0.83 or more and 1.15 or less, the pressure loss ratio being a ratio of pressure losses of the air filter media before and after the disinfection treatment of the fluororesin porous membrane.

11 Claims, 3 Drawing Sheets

(51) Int. Cl.
   *B01D 65/06* (2006.01)
   *B01D 71/36* (2006.01)
   *B01D 71/48* (2006.01)

(56) References Cited

U.S. PATENT DOCUMENTS

| | | |
|---|---|---|
| 2015/0082757 A1 | 3/2015 | Chaen et al. |
| 2017/0128876 A1 | 5/2017 | Shibuya et al. |
| 2017/0348626 A1 | 12/2017 | Sakano et al. |
| 2018/0065094 A1 | 3/2018 | Chaen et al. |
| 2019/0134552 A1 | 5/2019 | Sakano et al. |
| 2021/0162330 A1 | 6/2021 | Uchiyama |
| 2021/0260516 A1* | 8/2021 | Inui .................... B01D 39/1692 |

FOREIGN PATENT DOCUMENTS

| | | |
|---|---|---|
| CN | 112089134 A | 12/2020 |
| EP | 0 661 336 A1 | 7/1995 |
| EP | 2 818 223 A1 | 12/2014 |
| EP | 3 569 300 A1 | 11/2019 |
| EP | 3 824 987 A1 | 5/2021 |
| EP | 3 858 456 A1 | 8/2021 |
| EP | 4 289 495 A1 | 12/2023 |
| JP | 7-196831 A | 8/1995 |
| JP | 2013-173078 A | 9/2013 |
| JP | 2020-108881 A | 7/2020 |
| WO | WO 2013/157647 A1 | 10/2013 |
| WO | WO 2015/146847 A1 | 10/2015 |
| WO | WO 2016/104589 A1 | 6/2016 |
| WO | WO 2019/230983 A1 | 12/2019 |
| WO | WO 2020/067182 A1 | 4/2020 |
| WO | WO 2020/137733 A1 | 7/2020 |

OTHER PUBLICATIONS

International Search Report for PCT/JP2022/022497 (PCT/ISA/210) mailed on Aug. 2, 2022.

Extended European Search Report for European Application No. 22816198.0, dated Jul. 18, 2024.

* cited by examiner

AIR FILTER MEDIUM, PLEATED FILTER MEDIUM, AIR FILTER UNIT, MASK FILTER MEDIUM, AND METHOD FOR REGENERATING AIR FILTER MEDIUM

CROSS REFERENCE TO RELATED APPLICATIONS

This application is a Continuation of PCT International Application No. PCT/JP2022/022497, filed on Jun. 2, 2022, which claims priority under 35 U.S.C. § 119(a) to Patent Application No. JP 2021-094637, filed in Japan on Jun. 4, 2021, all of which are hereby expressly incorporated by reference into the present application.

TECHNICAL FIELD

The present disclosure relates to an air filter medium, a pleated filter medium, an air filter unit, a mask filter medium, and a method for regenerating an air filter medium.

BACKGROUND ART

In the related art, for example, porous membranes (hereafter may be referred to as PTFE porous membranes) formed of polytetrafluoroethylene (hereafter may be referred to as PTFE) are used as air filters. Such a PTFE porous membrane has a higher collection efficiency than glass fiber filter media at the same pressure loss, and therefore is particularly suitably used for HEPA filters (high efficiency particulate air filters) and ULPA filters (ultra low penetration air filters).

For example, an air filter medium disclosed in PTL 1 (International Publication No. 2013/157647) and having a PTFE porous membrane with good performance has been proposed as such a filter.

SUMMARY

An air filter medium according to a first aspect is an air filter medium including a fluororesin porous membrane and a supporting member stacked on top of each other. In the air filter medium, a permeability ratio (permeability after disinfection treatment/permeability before disinfection treatment), which is a ratio of a permeability of the air filter medium after a disinfection treatment of the fluororesin porous membrane as determined using NaCl particles having a particle size of 0.1 μm to a permeability of the air filter medium before the disinfection treatment of the fluororesin porous membrane as determined using NaCl particles having a particle size of 0.1 μm, is 5.0 or less. In the air filter medium, a pressure loss ratio (pressure loss after disinfection treatment/pressure loss before disinfection treatment), which is a ratio of a pressure loss of the air filter medium after the disinfection treatment of the fluororesin porous membrane as determined when air is passed at a flow rate of 5.3 cm/s to a pressure loss of the air filter medium before the disinfection treatment of the fluororesin porous membrane as determined when air is passed at a flow rate of 5.3 cm/s, is 0.83 or more and 1.15 or less.

DESCRIPTION OF EMBODIMENTS

Figure 1:
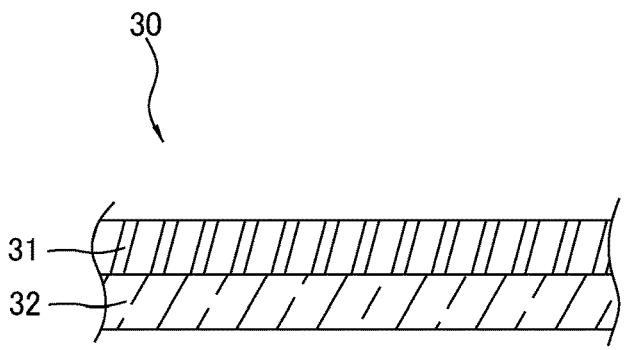
FIG. 1 is a schematic sectional view illustrating a layer structure of an air filter medium (part one).

Hereafter, an air filter medium, a pleated filter medium, an air filter unit, a mask filter medium, and a method for regenerating an air filter medium will be described with reference to examples.

(1) Air Filter Medium

The air filter medium includes a fluororesin porous membrane and a supporting member. The supporting member is stacked on the fluororesin porous membrane in the thickness direction.

The air filter medium can be reused with a small decrease in performance even when viruses and bacteria adhering to the air filter medium are reduced or removed by performing a disinfection treatment described later.

The physical properties of the air filter medium described in the present embodiment and a fluororesin porous membrane described later are, unless otherwise specified, values in a non-charged state in which the air filter medium and the fluororesin porous membrane are each not charged, and are also values in an initial state in which the air filter medium and the fluororesin porous membrane are unused. Note that the non-charged state refers to a state in which electrification is not caused by being subjected to a static elimination treatment conforming to "JIS B 9908-4, Part 4: Test Method for Static Elimination Treatment of Ventilating Air Filter Unit". Some publicly known filter media have good collection efficiency and the like when used in a charged state. However, when such a filter medium is used in a wet state or when the charged state cannot be maintained due to moisture contained in human breath or the like, the collection efficiency and the like are not maintained in a favorable manner. In contrast, even when the air filter medium and the fluororesin porous membrane according to the present embodiment are in a non-charged state, a decrease in collection efficiency is suppressed, and the collection efficiency is favorably maintained.

(1-1) Permeability

The permeability ratio (permeability after disinfection treatment/permeability before disinfection treatment), which is a ratio of the permeability of an air filter medium after disinfection treatment of a fluororesin porous membrane as determined using NaCl particles having a particle size of 0.1 μm to the permeability of the air filter medium before disinfection treatment of the fluororesin porous membrane as determined using NaCl particles having a particle size of 0.1 μm, is 5.0 or less. The permeability ratio is preferably 3.0 or less and more preferably 2.5 or less. The lower limit of the permeability ratio is not limited and may be, for example, 0.1.

In particular, when the disinfection treatment is a disinfection treatment using a surfactant or a disinfection treatment using an alcohol, the permeability ratio is preferably 5.0 or less, more preferably 3.0 or less, and further preferably 2.0 or less.

The permeability (%) is a value obtained by subtracting, from 100, a collection efficiency (%) determined using NaCl particles having a particle size of 0.1 μm.

The "permeability before disinfection treatment" here is not limited, and may be a permeability of an initial air filter medium before use or may be a permeability of an air filter medium after use and immediately before disinfection treatment. However, it is preferable to specify the above permeability ratio by using a lower one of these permeabilities as the "permeability before disinfection treatment".

For the initial air filter medium before use, the permeability determined using NaCl particles having a particle size of 0.1 μm is not limited. The permeability may be 10% or less and is preferably 5% or less and more preferably 0.1% or less.

(1-2) Pressure Loss

The air filter medium has a pressure loss ratio (pressure loss after disinfection treatment/pressure loss before disinfection treatment) of 0.83 or more and 1.15 or less. The pressure loss ratio is a ratio of the pressure loss of an air filter medium after disinfection treatment of the fluororesin porous membrane to the pressure loss of an air filter medium before disinfection treatment of a fluororesin porous membrane. The upper limit of the pressure loss ratio is more preferably 1.1 and further preferably 1.05.

In particular, when the disinfection treatment is a disinfection treatment using a surfactant or a disinfection treatment using an alcohol, the pressure loss ratio is preferably 0.83 or more and 1.15 or less.

The "pressure loss before disinfection treatment" here is not limited, and may be a pressure loss of an initial air filter medium before use or may be a pressure loss of an air filter medium after use and immediately before disinfection treatment. However, it is preferable to specify the above pressure loss ratio by using a lower one of these pressure losses as the "pressure loss before disinfection treatment".

The pressure loss of the initial air filter medium before use is preferably 200 Pa or less. When the air filter medium is used for masks, the pressure loss may be 80 Pa or less and is preferably 70 Pa or less and more preferably 60 Pa or less from the viewpoint of reducing breathing difficulty of users to achieve ease of breathing. The lower limit of the pressure loss of the air filter medium is not limited, and may be 20 Pa. The pressure loss of the air filter medium can be measured as a pressure loss given when air is passed at a flow rate of 5.3 cm/s.

(1-3) PF Value

The PF of the initial air filter medium before use is preferably 19 or more and more preferably 21 or more.

The PF is a value determined from the formula PF={−log((100−collection efficiency (%))/100)}/(pressure loss (Pa)/1000) using the pressure loss given when air is passed at a flow rate of 5.3 cm/s and the collection efficiency determined using NaCl particles having a particle size of 0.1 μm.

(1-4) Thickness

The thickness of the air filter medium is, for example, preferably 200 μm or more and 500 μm or less. The thickness of the air filter medium is a thickness measured when a load of 0.3 N is imposed on a measurement target in a particular measuring instrument.

(1-5) Liquid Penetrability

The air filter medium is preferably an air filter medium into which a droplet of a mixed liquid of isopropyl alcohol and water at a volume ratio of 60:40 penetrates when being allowed to stand for 30 seconds. This makes it possible to increase the work efficiency in the case where the air filter medium is subjected to a disinfection treatment using a chemical solution, and to sufficiently disinfect the inside of the air filter medium.

(1-6) Layer Structure of Air Filter Medium

The specific layer structure of the air filter medium described above is not limited.

Figure 2:
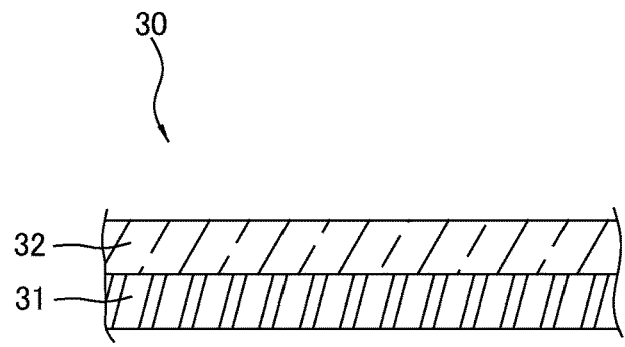
FIG. 2 is a schematic sectional view illustrating a layer structure of an air filter medium (part two).
Figure 3:
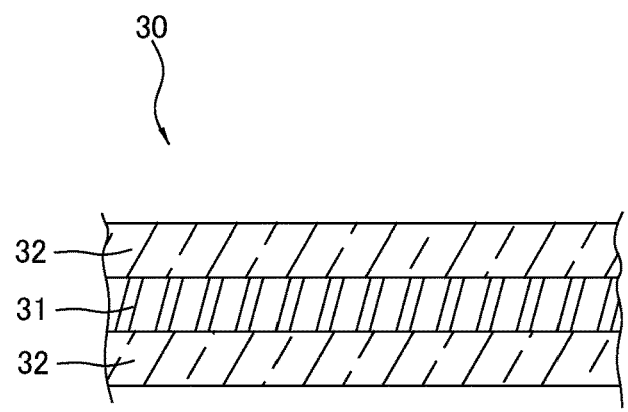
FIG. 3 is a schematic sectional view illustrating a layer structure of an air filter medium (part three).

For example, as in an air filter medium 30 in FIG. 1, the air filter medium may include a fluororesin porous membrane 31 and an air-permeable supporting member 32 stacked downstream of the fluororesin porous membrane 31 in the air flow direction. Alternatively, for example, as in an air filter medium 30 in FIG. 2, the air filter medium may include a fluororesin porous membrane 31 and an air-permeable supporting member 32 stacked upstream of the fluororesin porous membrane 31 in the air flow direction. Alternatively, for example, as in an air filter medium 30 in FIG. 3, the air filter medium may include a fluororesin porous membrane 31 and air-permeable supporting members 32 stacked both upstream and downstream of the fluororesin porous membrane 31 in the air flow direction.

The method for stacking these membranes, layers, and the like is not limited. The membranes and layers may be bonded to each other by using an anchor effect provided by partial melting through heating or melting of a hot-melt resin, may be bonded to each other by using a reactive adhesive or the like, or may be simply placed on top of each other.

Each layer and the relationship between the layers will be exemplified below.

(2) Fluororesin Porous Membrane

The fluororesin porous membrane may have a pressure loss of 200 Pa or less, preferably 80 Pa or less, and more preferably 70 Pa or less when air is passed at a flow rate of 5.3 cm/s. The pressure loss of the fluororesin porous membrane is not limited, and may be 20 Pa or more. The pressure loss of the fluororesin porous membrane is preferably 40 Pa or more from the viewpoint of easily obtaining a fluororesin porous membrane having good uniformity in the entire membrane while suppressing a decrease in collection efficiency.

The PF of the fluororesin porous membrane may be 19 or more and is more preferably 21 or more.

The fluororesin porous membrane preferably has a thickness of 10 μm or more. This makes it easy to obtain a porous membrane having an increased dust-holding capacity for polyalphaolefin particles. The thickness of the fluororesin porous membrane is preferably 50 μm or less from the viewpoint of suppressing an excessive increase in the thickness of folded portions when the fluororesin porous membrane is used while having folded portions. The thickness of the fluororesin porous membrane is a thickness measured when a load of 0.3 N is imposed on a measurement target in a particular measuring instrument.

The fluororesin porous membrane preferably has a dust-holding capacity for polyalphaolefin particles of 15.0 g/m$^2$ or more. The dust-holding capacity for polyalphaolefin particles means a weight per unit area of polyalphaolefin particles having a number median diameter of 0.25 μm and held in the fluororesin porous membrane when air containing the polyalphaolefin particles is continuously passed through the fluororesin porous membrane at a flow rate of 5.3 cm/s and the pressure loss of the fluororesin porous membrane increases by 250 Pa.

The coefficient of variation of the pressure loss is preferably 6.0 or less. The coefficient of variation (CV) of the pressure loss means a value obtained by dividing the standard deviation of the pressure loss distribution at some positions of the fluororesin porous membrane by the average of the pressure losses. In fluororesin porous membranes having a low pressure loss, the pressure loss is generally likely to vary at positions of the membrane. However, the air filter medium according to the present embodiment has a coefficient of variation of pressure loss of 6.0 or less. Therefore, even if the porous membrane has a low pressure loss, the uniformity of the membrane can be improved by being uniformly drawn. In particular, since mask filter media have a relatively small total area (for example, 500 cm$^2$ or less or 350 cm$^2$ or less), it is particularly desirable to suppress the formation of partially poor quality portions. Thus, an air filter medium capable of decreasing the coefficient of variation of pressure loss to is particularly suitable for use as a mask filter medium.

The filling factor of the fluororesin porous membrane may be substantially uniform in the thickness direction or may change in the thickness direction. The fluororesin porous membrane whose filling factor changes in the thickness direction is preferably a fluororesin porous membrane in which the filling factor of a portion on the windward side is lower than that of a portion on the leeward side (gradient density porous membrane).

Only one fluororesin porous membrane may be used, or two or more fluororesin porous membranes may be used in a stacked manner.

The fluororesin porous membrane is preferably a fluororesin porous membrane into which a droplet of a mixed liquid of isopropyl alcohol and water at a volume ratio of 60:40 penetrates when being allowed to stand for 30 seconds. This makes it possible to increase the work efficiency in the case where the fluororesin porous membrane is subjected to a disinfection treatment using a chemical solution for viruses and bacteria adhering to the fluororesin porous membrane, and to sufficiently disinfect the inside of the fluororesin porous membrane.

The fluororesin porous membrane contains a fluororesin, preferably mainly contains a fluororesin, and more preferably has a porous membrane structure including fibrils (fibers, not illustrated) and nodes (nodal portions, not illustrated) connected to the fibrils. Herein, the term "mainly" means that when a plurality of components is contained, the fluororesin has the highest content. The fluororesin porous membrane may contain, for example, 50 wt % or more of a fluororesin relative to the weight of the fluororesin porous membrane, preferably contains 80 wt % or more of a fluororesin, and more preferably contains 95 wt % or more of a fluororesin. The fluororesin porous membrane may be constituted by only a fluororesin. Since fluororesins have high chemical resistance, the deterioration of the filter medium is suppressed even when the disinfection treatment using a chemical solution is performed. In particular, fluororesins are better than other resins such as polyethylene terephthalate (PET) in that they are resistant to a wider variety of disinfection treatments. Furthermore, the fluororesin porous membrane is better than filter media formed of other resins in terms of easily suppressing an increase in pressure loss in a use environment with a solid dust load and easily and sufficiently suppressing an increase in pressure loss in an environment with a liquid dust load. The fluororesin porous membrane is better than other resins in terms of having high heat resistance and suppressing a decrease in performance even in the disinfection treatment in a high-temperature environment.

An example of the components other than the fluororesin in the fluororesin porous membrane is an inorganic filler that is a non-fibrillatable non-melt-fabricable component (B component) described later.

The fluororesin used for the fluororesin porous membrane may be formed of one component or two or more components. Furthermore, the fluororesin is, for example, a fluororesin containing a fibrillatable PTFE (hereafter also referred to as an A component). Furthermore the fluororesin is, for example, a three-component mixture of the A component, a non-fibrillatable non-melt-fabricable component (hereafter also referred to as a B component), and a non-fibrillatable melt-fabricable component (hereafter also referred to as a C component) having a melting point of lower than 320° C.

(2-1) A Component: Fibrillatable PTFE

The fibrillatable PTFE has, for example, drawability and non-melt fabricability. The term "non-melt fabricability" means that the polymer has a high melt viscosity and therefore does not readily flow in a molten state, which makes it difficult to perform melt fabrication. The fibrillatable PTFE preferably has a melt viscosity at 380° C. of 1×10$^8$ Pa·s or more.

The fibrillatable PTFE is, for example, a high-molecular-weight PTFE obtained through emulsion polymerization or suspension polymerization of tetrafluoroethylene (TFE). The high molecular weight herein is a molecular weight at which fibrillation is easily caused and fibrils having a large fiber length are obtained during drawing in the production of a porous membrane, the standard specific gravity (SSG) is 2.130 to 2.230, and the melt flow substantially does not occur because of the high melt viscosity. The SSG of the fibrillatable PTFE is preferably 2.130 to 2.190 and more preferably 2.140 to 2.170 from the viewpoint of achieving ease of fibrillation and providing fibrils having a large fiber length. An excessively high SSG may deteriorate the drawability. An excessively low SSG deteriorates the rollability and thus deteriorates the uniformity of the porous membrane, which may increase the pressure loss of the porous membrane. The standard specific gravity (SSG) is measured in conformity to ASTM D 4895.

From the viewpoint of achieving ease of fibrillation and providing fibrils having a large fiber length, a PTFE obtained through emulsion polymerization is preferred. Emulsion polymerization can be generally performed in an aqueous medium containing TFE or TFE and a monomer other than TFE, a dispersant, and a polymerization initiator. The emulsion polymerization is preferably performed with gentle stirring under stirring conditions set so that the produced PTFE fine particles do not aggregate. In the emulsion polymerization, the polymerization temperature is generally 20 to 100° C. and preferably 50 to 85° C. The polymerization pressure is generally 0.5 to 3.0 MPa. The polymerization initiator in the emulsion polymerization is preferably, for example, a radical polymerization initiator or a redox polymerization initiator. The amount of the polymerization initiator is preferably as small as possible from the viewpoint that production of PTFE having a low molecular weight is suppressed and PTFE having a low SSG can be obtained. However, when the amount is excessively small, the polymerization rate tends to be excessively low. When the amount is excessively large, PTFE having a high SSG tends to be produced.

PTFE may constitute a fine powder obtained by emulsion polymerization. The fine powder can be obtained by collecting PTFE fine particles from the PTFE aqueous dispersion obtained by the above-described emulsion polymerization, coagulating the PTFE fine particles, and then drying the coagulated fine particles. The fine powder formed of the PTFE has good extrudability, and can be paste-extruded at an extrusion pressure of, for example, 20 MPa or less. The extrusion pressure is a pressure measured when paste extrusion is performed through an orifice (diameter 2.5 cm, land length 1.1 cm, and entrance angle 30°) at a reduction ratio of 100, an extrusion speed of 51 cm/min, and a temperature of 25° C. In the paste extrusion, in general, the fine powder is mixed with an extrusion aid (lubricant), then premolded, and extruded. The extrusion aid is not limited, and a publicly known extrusion aid can be used. The extrusion aid is preferably a petroleum hydrocarbon having a boiling point of 150° C. or higher, such as naphtha. The amount of the extrusion aid used varies depending on, for example, the kind of the extrusion aid, but is usually 5 parts by weight or more and 50 parts by weight (P) or less based on 100 parts by weight of the PTFE powder. The amount is preferably 10 parts by weight or more and 40 parts by weight or less and more preferably parts by weight or more and 35 parts by weight or less. The premolding and extrusion can be performed by publicly known methods, and the conditions can be appropriately selected.

The presence or absence of fibrillability, that is, whether fibrillation is achieved or not can be judged by checking whether paste extrusion, which is a typical method for molding a high-molecular-weight PTFE powder obtained from a polymer of TFE, can be performed or not. Normally, paste extrusion can be performed because a high-molecular-weight PTFE has fibrillability. In the case where an unfired molded body obtained through paste extrusion substantially does not have strength or elongation, such as the case where the molded body has an elongation of 0% and is broken when stretched, such a molded body can be considered to have no fibrillability.

The high-molecular-weight PTFE may be a modified polytetrafluoroethylene (hereafter referred to as a modified PTFE), a homo-polytetrafluoroethylene (hereafter referred to as a homo-PTFE), or a mixture of a modified PTFE and a homo-PTFE. The content of the modified PTFE in the high-molecular-weight PTFE is preferably 10 wt % or more and 98 wt % or less and more preferably 50 wt % or more and 95 wt % or less from the viewpoint of favorably maintaining the moldability of polytetrafluoroethylene. Non-limiting examples of the homo-PTFE that can be suitably used include homo-PTFEs disclosed in Japanese Unexamined Patent Application Publication No. S53-60979, Japanese Unexamined Patent Application Publication No. S57-135, Japanese Unexamined Patent Application Publication No. S61-16907, Japanese Unexamined Patent Application Publication No. S62-104816, Japanese Unexamined Patent Application Publication No. S62-190206, Japanese Unexamined Patent Application Publication No. S63-137906, Japanese Unexamined Patent Application Publication No. 2000-143727, Japanese Unexamined Patent Application Publication No. 2002-201217, International Publication No. 2007/046345, International Publication No. 2007/119829, International Publication No. 2009/001894, International Publication No. 2010/113950, and International Publication No. 2013/027850. In particular, homo-PTFEs disclosed in Japanese Unexamined Patent Application Publication No. S57-135, Japanese Unexamined Patent Application Publication No. S63-137906, Japanese Unexamined Patent Application Publication No. 2000-143727, Japanese Unexamined Patent Application Publication No. 2002-201217, International Publication No. 2007/046345, International Publication No. 2007/119829, and International Publication No. 2010/113950 are preferred from the viewpoint of high drawability.

The modified PTFE is constituted by TFE and a monomer other than TFE (hereafter referred to as a modifying monomer). Non-limiting examples of the modified PTFE include PTFEs homogeneously modified by the modifying monomer, PTFEs modified at the beginning of polymerization reaction, and PTFEs modified at the end of polymerization reaction. The modified PTFE is preferably a TFE copolymer obtained by subjecting a trace amount of a monomer other than TFE to polymerization together with TFE without considerably impairing the properties of the TFE homopolymer. Examples of the modified PTFE that can be suitably used include modified PTFEs disclosed in Japanese Unexamined Patent Application Publication No. S60-42446, Japanese Unexamined Patent Application Publication No. S61-16907, Japanese Unexamined Patent Application Publication No. S62-104816, Japanese Unexamined Patent Application Publication No. S62-190206, Japanese Unexamined Patent Application Publication No. S64-1711 Japanese Unexamined Patent Application Publication No. H02-261810, Japanese Unexamined Patent Application Publication No. H11-240917, Japanese Unexamined Patent Application Publication No. 11-240918, International Publication No. 2003/033555, International Publication No. 2005/061567, International Publication No. 2007/005361, International Publication No. 2011/055824, and International Publication No. 2013/027850. In particular, modified PTFEs disclosed in Japanese Unexamined Patent Application Publication No. S61-16907, Japanese Unexamined Patent Application Publication No. S62-104816, Japanese Unexamined Patent Application Publication No. S64-1711, Japanese Unexamined Patent Application Publication No. H11-240917, International Publication No. 2003/033555, International Publication No. 2005/061567, International Publication No. 2007/005361, and International Publication No. 2011/055824 are preferred from the viewpoint of high drawability.

The modified PTFE contains a TFE unit based on TFE and a modifying monomer unit based on the modifying monomer. The modifying monomer unit is a moiety in a molecular structure of the modified PTFE, the moiety being derived from the modifying monomer. The content of the modifying monomer unit in all monomer units of the modified PTFE is preferably 0.001 to 0.500 wt % and more preferably 0.01 to 0.30 wt %. The all monomer units are moieties derived from all monomers in a molecular structure of the modified PTFE.

The modifying monomer is not limited as long as the modifying monomer is copolymerizable with TFE. Examples of the modifying monomer include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ethers; and (perfluoroalkyl) ethylenes (PFAE) and ethylene. A single modifying monomer may be used or a plurality of modifying monomers may be used.

The perfluorovinyl ethers are not limited. For example, an unsaturated perfluoro compound represented by general formula (1) below can be used.

$$CF_2=CF-ORf \tag{1}$$

In the formula, Rf represents a perfluoro organic group.
In this specification, the perfluoro organic group is an organic group obtained by substituting all hydrogen atoms bonding to carbon atoms with fluorine atoms. The perfluoro organic group may contain ether oxygen.

An example of the perfluorovinyl ether is a perfluoro (alkyl vinyl ether) (PAVE) with Rf representing a perfluoroalkyl group having 1 to 10 carbon atoms in the general formula (1). The perfluoroalkyl group preferably has 1 to 5 carbon atoms. Examples of the perfluoroalkyl group in PAVE include a perfluoromethyl group, a perfluoroethyl group, a perfluoropropyl group, a perfluorobutyl group, a perfluoropentyl group, and a perfluorohexyl group. The PAVE is preferably perfluoro(propyl vinyl ether) (PPVE) or perfluoro(methyl vinyl ether) (PMVE).

The perfluoroalkyl ethylene (PFAE) is not limited, and examples thereof include perfluorobutyl ethylene (PFBE) and perfluorohexyl ethylene (PFHE).

The modifying monomer in the modified PTFE is preferably at least one monomer selected from the group consisting of HFP, CTFE, VDF, PAVE, PFAE, and ethylene.

When the fluororesin porous membrane is formed by using a B component and a C component described later, the content of the homo-PTFE in the fibrillatable PTFE is particularly preferably more than 50 wt % from the viewpoint of achieving ease of fibrillation and providing fibrils having a large fiber length.

When not only the fibrillatable PTFE (A component) but also a non-fibrillatable non-melt-fabricable component (B component) and a non-fibrillatable melt-fabricable component having a melting point of lower than 320° C. (C component) are contained in the fluororesin porous membrane, the following components can be used as the B component and the C component. The fluororesin porous membrane formed of these three components has a membrane structure with a higher porosity and a larger thickness than known fibrillatable PTFE (high-molecular-weight PTFE) porous membranes. Therefore, fine particles in gas can be collected in a large region in a thickness direction of the filter medium, which can improve the dust-holding capacity. By forming the fluororesin porous membrane from these three components, the dust-holding capacity of liquid particles can be particularly increased rather than that of solid particles.

(2-2) B Component: Non-Fibrillatable Non-Melt-Fabricable Component

The non-fibrillatable non-melt-fabricable component is mainly unevenly distributed in the nodal portions as non-fibrous particles and has a function of suppressing fibrillation of the fibrillatable PTFE.

Examples of the non-fibrillatable non-melt-fabricable component include components having thermoplasticity, such as low-molecular-weight PTFEs; thermosetting resins; inorganic fillers; and mixtures of the foregoing.

The component having thermoplasticity preferably has a melting point of 320° C. or higher and has as high a melt viscosity as possible. For example, the low-molecular-weight PTFE has a high melt viscosity and therefore can remain in the nodal portions even when processed at a temperature higher than or equal to the melting point. In this specification, the low-molecular-weight PTFE is a PTFE having a number-average molecular weight of 600,000 or less, a melting point of 320° C. or higher and 335° C. or lower, and a melt viscosity at 380° C. of 100 Pa·s to 7.0×10$^5$ Pa·s (refer to Japanese Unexamined Patent Application Publication No. H10-147617).

Examples of the method for producing a low-molecular-weight PTFE include a method in which a high-molecular-weight PTFE powder (molding powder) obtained through suspension polymerization of TFE or a high-molecular-weight PTFE powder (FP: fine powder) obtained through emulsion polymerization of TFE and a particular fluoride are thermally decomposed by causing a catalytic reaction at high temperature (refer to Japanese Unexamined Patent Application Publication No. S61-162503), a method in which the high-molecular-weight PTFE powder or a molded body is irradiated with ionizing radiation (refer to Japanese Unexamined Patent Application Publication No. S48-78252), and a method in which TFE is directly polymerized together with a chain transfer agent (refer to, e.g., International Publication No. 2004/050727, International Publication No. 2009/020187, and International Publication No. 2010/114033). The low-molecular-weight PTFE may be a homo-PTFE or the above-described modified PTFE containing a modifying monomer as in the case of the fibrillatable PTFE.

The low-molecular-weight PTFE has no fibrillability. The presence or absence of fibrillability can be judged by the above-described method. For the low-molecular-weight PTFE, an unfired molded body obtained through paste extrusion substantially does not have strength or elongation, such as an elongation of 0%, and is broken when stretched.

The low-molecular-weight PTFE is not limited, but preferably has a melt viscosity at 380° C. of 1000 Pa·s or more, more preferably 5000 Pa·s or more, and further preferably 10000 Pa·s or more. At a high melt viscosity, even if the non-fibrillatable melt-fabricable component serving as a C component is melted during production of the porous membrane, the non-fibrillatable non-melt-fabricable component can remain in the nodal portions, which can suppress the fibrillation.

Examples of the thermosetting resin include epoxy resin, silicone resin, polyester resin, polyurethane resin, polyimide resin, phenolic resin, and mixtures of the foregoing resins. The thermosetting resin is desirably an uncured resin dispersed in water from the viewpoint of workability of co-coagulation. Each of these thermosetting resins is commercially available.

Examples of the inorganic filler include talc, mica, calcium silicate, glass fiber, calcium carbonate, magnesium carbonate, carbon fiber, barium sulfate, calcium sulfate, and mixtures of the foregoing. In particular, talc is preferably used from the viewpoint of specific gravity and affinity for a fibrillatable high-molecular-weight PTFE. The inorganic filler preferably has a particle size of 3 μm or more and 20 μm or less from the viewpoint of formation of a stable dispersion body during production of the porous membrane. The particle size is an average particle size measured by a laser diffraction/scattering method. Each of these inorganic fillers is commercially available.

The non-fibrillatable non-melt-fabricable component may contain the above-described components in a combined manner.

The content of the non-fibrillatable non-melt-fabricable component in the porous membrane is preferably 1 wt % or more and 50 wt % or less. When the content of the non-fibrillatable non-melt-fabricable component is 50 wt % or less, the fibrous structure of the porous membrane is easily maintained. The content of the non-fibrillatable non-melt-fabricable component is preferably 20 wt % or more and 40 wt % or less and more preferably 30 wt %. When the content is 20 wt % or more and 40 wt % or less, the fibrillation of the fibrillatable PTFE can be more effectively suppressed.

(2-3) C Component: Non-Fibrillatable Melt-Fabricable Component Having Melting Point of Lower than 320° C.

The non-fibrillatable melt-fabricable component having a melting point of lower than 320° C. (hereafter also referred to as a non-fibrillatable melt-fabricable component) has flowability when melted. Therefore, the non-fibrillatable melt-fabricable component can be melted during production (drawing) of the porous membrane and cured in the nodal portions. This increases the strength of the whole porous membrane and thus can suppress the deterioration of filter performance even if the porous membrane is subjected to compression, and the like, in the downstream processes.

The non-fibrillatable melt-fabricable component preferably has a melt viscosity of less than 10000 Pa·s at 380° C. The melting point of the non-fibrillatable melt-fabricable component is a temperature at a peak top of a heat-of-fusion curve obtained when the component is heated to a temperature higher than or equal to the melting point at a temperature-increasing rate of 10° C./min to be completely melted once, cooled to a temperature lower than or equal to the melting point at 10° C./min, and then heated again at 10° C./min using a differential scanning calorimeter (DSC).

Examples of the non-fibrillatable melt-fabricable component include components that sufficiently exhibit meltability and flowability at a drawing temperature during production of the porous membrane, such as heat-meltable fluoropolymer, polystyrene resin, polyethylene terephthalate (PET) resin, polyester resin, polyamide resin, and mixtures of the foregoing resins. In particular, a heat-meltable fluoropolymer is preferred from the viewpoint of high heat resistance at a drawing temperature during production of the porous membrane and high chemical resistance. The heat-meltable fluoropolymer is a fluoropolymer having a copolymer unit derived from at least one fluorinated ethylenically unsaturated monomer, preferably two or more fluorinated ethylenically unsaturated monomers, represented by general formula (2) below.

$$RCF=CR_2 \tag{2}$$

(In the formula, each R independently selected from H, F, Cl, alkyl having 1 to 8 carbon atoms, aryl having 6 to 8 carbon atoms, cyclic alkyl having 3 to 10 carbon atoms, and perfluoroalkyl having 1 to 8 carbon atoms. In this case, all R may be the same, any two R may be the same and the remaining one R may be different from the two R, or all R may be different from each other.)

Non-limiting useful examples of the compound represented by the general formula (2) include perfluoroolefins such as fluoroethylene, VDF, trifluoroethylene, TFE, and HFP; chlorofluoroolefins such as CTFE and dichlorodifluoroethylene; (perfluoroalkyl)ethylenes such as PFBE and PFHE; perfluoro-1,3-dioxole; and mixtures of the foregoing.

The fluoropolymer may also include a copolymer derived from copolymerization of at least one monomer represented by the general formula (2) and at least one copolymerizable comonomer represented by the above general formula (1) and/or general formula (3) below.

$$R_2C=CR_2 \tag{3}$$

(In the formula, each R independently selected from H, Cl, an alkyl group having 1 to 8 carbon atoms, an aryl group having 6 to 8 carbon atoms, and a cyclic alkyl group having 3 to 10 carbon atoms. In this case, all R may be the same, any two or more R may be the same and the remaining R may be different from the two or more R, or all R may be different from each other. If the remaining R are plural R, the plural R may be different from each other.)

A useful example of the compound represented by the general formula (1) is a perfluoro(alkyl vinyl ether) (PAVE).

The PAVE is preferably perfluoro(propyl vinyl ether) (PPVE) or perfluoro(methyl vinyl ether) (PMVE).

Useful examples of the compound represented by the general formula (3) include ethylene and propylene.

More specific examples of the fluoropolymer include polyfluoroethylene derived from polymerization of fluoroethylene, polyvinylidene fluoride (PVDF) derived from polymerization of vinylidene fluoride (VDF), polychlorotrifluoroethylene (PCTFE) derived from polymerization of chlorotrifluoroethylene (CTFE), a fluoropolymer derived from copolymerization of two or more different monomers represented by the general formula (2), and a fluoropolymer derived from copolymerization of at least one monomer represented by the general formula (2) and at least one monomer represented by the general formula (1) and/or at least one monomer represented by the general formula (3).

Examples of the fluoropolymer include polymers having a copolymer unit derived from VDF and hexafluoropropylene (HFP) and polymers derived from TFE and at least one copolymerizable comonomer (at least three wt %) other than TFE. Examples of the latter fluoropolymer include TFE/PAVE copolymers (PFA), TFE/PAVE/CTFE copolymers, TFE/HFP copolymers (FEP), TFE/ethylene copolymers (ETFE), TFE/HFP/ethylene copolymers (EFEP), TFE/VDF copolymers, TFE/VDF/HFP copolymers, TFE/VDF/CTFE copolymers, and mixtures of the foregoing copolymers.

The non-fibrillatable melt-fabricable component may contain the above-described components in a combined manner.

The content of the non-fibrillatable melt-fabricable component in the porous membrane is preferably 0.1 wt % or more and less than 20 wt %. When the content is less than 20 wt %, the non-fibrillatable melt-fabricable component is dispersed in portions other than the nodal portions in the porous membrane, which suppresses an increase in the pressure loss of the porous membrane. Furthermore, when the content is less than 20 wt %, drawing is easily performed at a high area drawing ratio of 40 times or more. When the content of the non-fibrillatable melt-fabricable component in the porous membrane is 0.1 wt % or more, the deterioration of filter performance of the porous membrane is sufficiently suppressed even if a compressive force or the like is exerted in the downstream processes. The content of the non-fibrillatable melt-fabricable component in the porous membrane is preferably 15 wt % or less and more preferably 10 wt % or less. The content of the non-fibrillatable melt-fabricable component in the porous membrane is preferably 0.5 wt % or more from the viewpoint of ensuring the strength of the porous membrane. The content is particularly preferably about 5 wt %.

The content ratio of the non-fibrillatable melt-fabricable component is preferably 10 wt % or less to satisfactorily perform drawing at an area drawing ratio of 40 times or more and 800 times or less.

(2-4) Method for Producing Fluororesin Porous Membrane

Next, a method for producing an air filter medium will be described by taking examples.

In the production of the fluororesin porous membrane, a fluororesin can be used. For example, the fluororesin is preferably formed of the above-described A component or the above-described three components.

The form of the three components A to C described above is not limited, and is, for example, a composition, a mixed powder, or a molding material described later. The composition, the mixed powder, and the molding material each contain the above-described A component, B component, and C component and each contain the C component, for example, in an amount of 0.1 wt % or more and less than 20 wt % relative to the total amount.

The form of the raw material for the porous membrane may be a mixed powder described later or a non-powdery mixture or may be a molding material or a composition described later. The mixed powder is, for example, a fine powder obtained through co-coagulation, which are used in Examples below, a powder obtained by mixing two raw materials out of three through co-coagulation and mixing the remaining component using a mixer, or a powder obtained by mixing three raw materials using a mixer. The non-powdery mixture is, for example, a molded body such as a porous body (e.g., a porous membrane) or an aqueous dispersion body containing the three components.

The molding material is a material adjusted for processing required to mold a composition, such as a material to which a processing aid (e.g., liquid lubricant) or the like is added, a material whose grain size is adjusted, or a preliminarily molded material. The molding material may contain, for example, a publicly known additive in addition to the above three components. Examples of the publicly known additive include carbon materials such as carbon nanotube and carbon black, pigments, photocatalysts, activated carbon, antibacterial agents, adsorbents, and deodorizers.

The composition can be produced by various methods. For example, when the composition is a mixed powder, the composition can be produced by a method in which a powder of the A component, a powder of the B component, and a powder of the C component are mixed with each other using a typical mixer or the like, a method in which an aqueous dispersion containing the A component, an aqueous dispersion containing the B component, and an aqueous dispersion containing the C component are co-coagulated to obtain a co-coagulated powder, or a method in which a mixed powder obtained by, in advance, co-coagulating an aqueous dispersion containing any two components of the A component, the B component, and the C component is mixed with a powder of the remaining one component using a typical mixer or the like. In particular, the composition is preferably a composition obtained by co-coagulating an aqueous dispersion containing the A component, an aqueous dispersion containing the B component, and an aqueous dispersion containing the C component from the viewpoint of ease of uniform dispersion of the three different components.

The size of the mixed powder obtained by co-coagulation is not limited, and, for example, the average particle size is 100 μm or more and 1000 μm or less and preferably 300 μm or more and 800 μm or less. In this case, the average particle size is measured in conformity to JIS K6891. The apparent density of the mixed powder obtained by co-coagulation is not limited, and is, for example, 0.40 g/ml or more and 0.60 g/ml or less and preferably 0.45 g/ml or more and 0.55 g/ml or less. The apparent density is measured in conformity to JIS K6892.

The Co-Coagulation Method is, for Example, as Follows:
(i) a method in which an aqueous dispersion of the A component, an aqueous dispersion of the B component, and an aqueous dispersion of the C component are mixed with each other and then coagulation is performed;
(ii) a method in which an aqueous dispersion containing any one of the A component, the B component, and the C component is mixed with powders of the remaining two components and then coagulation is performed;
(iii) a method in which a powder of any one of the A component, the B component, and the C component is added to a mixed aqueous dispersion containing aqueous dispersions of the remaining two components in a mixed manner and then coagulation is performed; and
(iv) a method in which a two-component mixed powder obtained by mixing in advance aqueous dispersions of any two of the A component, the B component, and the C component and then performing coagulation is added to an aqueous dispersion of the remaining one component and then coagulation is performed.

The method (i) is preferred as a co-coagulation method because the three components are easily dispersed in a uniform manner.

In the co-coagulation performed by the methods (i) to (iv), coagulation is preferably performed by adding any of an acid such as nitric acid, hydrochloric acid, or sulfuric acid; a metal salt such as magnesium chloride, calcium chloride, sodium chloride, aluminum sulfate, magnesium sulfate, barium sulfate, sodium hydrogencarbonate, or sodium carbonate; or an organic solvent such as acetone or methanol.

The form of the A component before mixing is not limited, and may be an aqueous dispersion or a powder of the above-described fibrillatable PTFE. Examples of the powder (in particular, the above-described FP: fine powder) include "Teflon 6-J" (Teflon: registered trademark), "Teflon 6C-J", and "Teflon 62-J" manufactured by Du Pont-Mitsui Fluorochemicals Company, Ltd.; "POLYFLON F106", "POLYFLON F104", "POLYFLON F201", and "POLYFLON F302" manufactured by DAIKIN INDUSTRIES, Ltd.; "Fluon CD123", "Fluon CD1", "Fluon CD141", and "Fluon CD145" manufactured by AGC Inc.; and "Teflon 60", "Teflon 60 X", "Teflon 601A", "Teflon 601 X", "Teflon 613A", "Teflon 613A X", "Teflon 605XT X", and "Teflon 669 X" manufactured by Du Pont. Alternatively, the fine powder may be obtained by coagulating and drying an aqueous dispersion (an as-polymerized aqueous dispersion) of a fibrillatable PTFE obtained through emulsion polymerization of TFE.

The aqueous dispersion of a fibrillatable PTFE may be the as-polymerized aqueous dispersion or a commercially available aqueous dispersion. A preferred method for producing the as-polymerized aqueous dispersion of a fibrillatable PTFE is a production method disclosed in the above patent documents listed for disclosing homo-PTFEs. Examples of the commercially available aqueous dispersion of a fibrillatable PTFE include aqueous dispersions such as "POLYFLON D-110", "POLYFLON D-210", "POLYFLON D-210C", and "POLYFLON D-310" manufactured by DAIKIN INDUSTRIES, Ltd.; "Teflon 31-JR" and "Teflon 34-JR" manufactured by Du Pont-Mitsui Fluorochemicals Company, Ltd.; and "Fluon AD911L", "Fluon AD912L", and "AD938L" manufactured by AGC Inc. Since any commercially available aqueous dispersion of a fibrillatable PTFE contains 2 to 10 parts by weight of a nonionic surfactant or the like relative to 100 parts by weight of PTFE in the aqueous dispersion in order to maintain stability, the nonionic surfactant tends to remain in a mixed powder obtained by co-coagulation, which may cause a problem such as coloring of a porous body. Thus, the aqueous dispersion of a fibrillatable PTFE is preferably an as-polymerized aqueous dispersion.

The form of the B component before mixing is not limited. When the B component is a low-molecular-weight PTFE, the form of the B component before mixing is not limited, but may be an aqueous dispersion body or a powder (generally referred to as a PTFE micropowder or a micropowder). Examples of the powder of the low-molecular-weight PTFE include "MP1300-J" manufactured by Du Pont-Mitsui Fluorochemicals Company, Ltd.; "Lubron L-5" and "Lubron L-5F" manufactured by DAIKIN INDUSTRIES, Ltd.; "Fluon L169J", "Fluon L170J", and "Fluon L172J" manufactured by AGC Inc.; and "KTL-F" and "KTL-500F" manufactured by KITAMURA Limited.

The aqueous dispersion of the low-molecular-weight PTFE may be the as-polymerized aqueous dispersion obtained through emulsion polymerization of TFE or a commercially available aqueous dispersion. Alternatively, an aqueous dispersion prepared by dispersing a micropowder in water using a surfactant or the like may be used. Examples of the preferred method for producing the as-polymerized aqueous dispersion of the fibrillatable PTFE include production methods disclosed in Japanese Unexamined Patent Application Publication No. H07-165828, Japanese Unexamined Patent Application Publication No. H10-147617, Japanese Unexamined Patent Application Publication No. 2006-063140, Japanese Unexamined Patent Application Publication No. 2009-1745, and International Publication No. 2009/020187. An example of the commercially available aqueous dispersion of the fibrillatable PTFE is an aqueous dispersion such as "Lubron LDW-410" manufactured by DAIKIN INDUSTRIES, Ltd. Since commercially available aqueous dispersions of a low-molecular-weight PTFE contain 2 to 10 parts by weight of a nonionic surfactant or the like relative to 100 parts by weight of PTFE in the aqueous dispersion in order to maintain stability, the nonionic surfactant tends to remain in a mixed powder obtained by co-coagulation, which may cause a problem such as coloring of a porous body. Thus, the aqueous dispersion of the low-molecular-weight PTFE is preferably an as-polymerized aqueous dispersion liquid.

When an inorganic filler is used as the B component, the form of the B component before mixing is also not limited, and is preferably an aqueous dispersion body. Examples of the inorganic filler include such as "Talc P2" manufactured by NIPPON TALC Co., Ltd. And "LMR-100" manufactured by FUJI TALC INDUSTRIAL Co., Ltd. They are used by dispersing a powder in water through, for example, appropriate surface treatment using a silane coupling agent or the like. In particular, a secondary crushed product (e.g., "Talc P2") obtained by using a jet mill is preferably used in terms of dispersibility in water.

Examples of the C component include fluororesins such as FEP and PFA and resins such as acrylic resin, urethane resin, and PET resin. The form of the C component before mixing is not limited, and is preferably an aqueous dispersion body. When a resin obtained through emulsion polymerization is used, the aqueous dispersion body may be an as-polymerized dispersion body or a dispersion body obtained by dispersing a resin powder in water using a surfactant or the like. The aqueous dispersion body is prepared by dispersing the C component in water in a predetermined amount so that the porous membrane contains 0.1 wt % or more and less than 20 wt % of the C component.

The method of co-coagulation is not limited, and it is preferable to mix three aqueous dispersion bodies and then exert a mechanical stirring force.

After the co-coagulation, dehydration and drying are performed and extrusion is performed using a liquid lubricant (extrusion aid) added. The liquid lubricant is not limited as long as the liquid lubricant can wet the surface of the PTFE powder and is a substance that can be removed after the mixture obtained through co-coagulation is molded into a film. Examples of the liquid lubricant include hydrocarbon oils such as liquid paraffin, naphtha, white oil, toluene, and xylene, alcohols, ketones, and esters.

The mixture obtained through co-coagulation is mixed with a liquid lubricant and then extruded and rolled by a publicly known method to obtain a molded film-like product. Herein, the amount of the liquid lubricant mixed with the fluororesin (for example, a mixture obtained by co-coagulation) can be set to 10 parts by weight or more and 40 parts by weight or less with respect to 100 parts by weight of the fluororesin, and is preferably 25 parts by weight or more and 35 parts by weight or less. By increasing the amount of the liquid lubricant, a large thickness of a fluororesin porous membrane to be obtained is ensured while the filling factor is decreased, which easily suppresses the pressure loss to be small. By decreasing the amount of the liquid lubricant, the collection efficiency of a fluororesin porous membrane to be obtained is easily increased, which easily suppresses the coefficient of variation of the pressure loss to be small.

The extrusion is performed by, for example, paste extrusion or ram extrusion and preferably by paste extrusion. A sheet-shaped extruded product obtained through paste extrusion is rolled using a calendar roll or the like under heating at a temperature of, for example, 40° C. or higher and 80° C. or lower. The thickness of the obtained film-like rolled product is set in accordance with the thickness of the intended porous membrane and is normally 100 µm or more and 1000 µm or less, may be 100 or more and 400 µm or less, and is preferably 150 µm or more and 350 µm or less.

Subsequently, the liquid lubricant is removed from the unfired film that is the rolled product. The liquid lubricant is removed by a heating method and/or an extracting method. When the three components A to C are used, the heating temperature in the heating method is not limited as long as the heating temperature is lower than the melting point of the non-fibrillatable melt-fabricable component. The heating temperature is, for example, 100° C. or higher and 250° C. or lower and may be 180° C. or higher and 200° C. or lower.

Herein, the rolled product from which the liquid lubricant has been removed is preferably subjected to heat treatment in an atmosphere at a temperature of 250° C. or higher and 325° C. or lower for 1 minute or longer before drawing from the viewpoint of sufficiently ensuring the thickness of the obtained fluororesin porous membrane and decreasing the pressure loss. The temperature of the heat treatment may be, for example, 320° C. or lower and is preferably lower than the melting point of the fluororesin used for producing the fluororesin porous membrane. In the case where a plurality of endothermic curves (primary melting point, secondary melting point) appears on a crystal melting curve when the rolled product is heated using a differential scanning calorimeter at a temperature-increasing rate of 10° C./min, the temperature of the heat treatment may be lower than or equal to the lower maximum peak temperature (primary melting point). The temperature of the heat treatment may be, for example, 260° C. or higher or 280° C. or higher, may be a temperature higher than or equal to the temperature at which the liquid lubricant is removed from the unfired film that is the rolled product by the heating method, or may be a temperature higher than or equal to the drawing temperature (in the case of biaxial drawing, the temperature of primary drawing performed earlier) from the viewpoint of sufficiently ensuring the thickness and sufficiently decreasing the pressure loss. The duration of the heat treatment is not limited, and may be, for example, 1 minute or longer and 2 hours or shorter or 30 minutes or longer and 1 hour or shorter in accordance with desired effects of the heat treatment.

To obtain fluororesin porous membranes having different filling factors in the thickness direction, the temperature is not limited, but the heat treatment is preferably performed such that the temperature on the side on which the filling factor is decreased is higher than that on the side on which the filling factor is increased. The heat treatment is preferably performed such that the temperature of the heat treatment in a portion on the windward side is higher than that in a portion on the leeward side. The portion on the leeward side may be cooled to a temperature lower than the normal temperature. Regarding the temperature of the heat treatment, the difference in temperature between the portion on the windward side and the portion on the leeward side may be 100° C. or higher and is preferably 200° C. or higher and more preferably 300° C. or higher from the viewpoint of generating a sufficient density difference. During the heat treatment, the heat treatment is preferably performed such that the heating time in the portion in which the filling factor is decreased is increased and the heating time in the portion in which the filling factor is increased is decreased. Accordingly, by drawing the obtained rolled product, the filling factor on the windward side can be decreased and the filling factor on the leeward side can be increased.

Thus, the rolled product from which the liquid lubricant has been removed or the rolled product further subjected to heat treatment is drawn. When the non-fibrillatable melt-fabricable component and the non-fibrillatable non-melt-fabricable component are contained, the drawing is performed at a temperature that is higher than or equal to the melting point of the non-fibrillatable melt-fabricable component and that is lower than or equal to the decomposition temperature of the non-fibrillatable non-melt-fabricable component.

When a non-fibrillatable melt-fabricable component is used in the production of the fluororesin porous membrane, the non-fibrillatable melt-fabricable component melts in the drawing process and subsequently solidifies at the nodal portions, which can increase the strength of the porous membrane in the thickness direction. The drawing temperature at this time may be set in accordance with the temperature of a furnace in which the drawing is performed, the temperature of a heating roller that conveys the rolled product, or a combination of these temperatures.

The drawing is performed in a first direction and preferably in a second direction orthogonal to the first direction. Herein, the drawing in the second direction may be performed after the drawing in the first direction. The drawing in the first direction and the drawing in the second direction may be simultaneously performed. After the drawing in the first direction at a first drawing speed, the drawing in the first direction is further performed at a second drawing speed, and then the drawing in the second direction may be performed. In the present embodiment, the first direction is a longitudinal direction (machine direction: MD) of the rolled product, and the second direction is a width direction (transverse direction: TD) of the rolled product. The drawing may be performed simultaneously while a plurality of rolled products is stacked.

The rolled product is preferably drawn at an area stretch magnification of 40 times or more and 800 times or less. Preferably, the drawing ratio is sufficiently increased because the fluororesin porous membrane can have a larger number of fibers and the collection efficiency can be easily improved, which can improve the uniformity of drawing to reduce the coefficient of variation of pressure loss. Preferably, the drawing ratio is sufficiently decreased because an excessive decrease in the thickness of the fluororesin porous membrane is suppressed, which can suppress a decrease in the dust-holding capacity.

From the viewpoint of increasing the thickness of the obtained fluororesin porous membrane to improve the dust-holding capacity and suppressing the coefficient of variation of pressure loss while decreasing the pressure loss, the drawing is preferably performed so as to provide a portion drawn at a drawing speed of 30%/s or less in the drawing direction and more preferably performed so as to provide a portion drawn at a drawing speed of 20%/s or less. In the case of biaxial drawing, it is sufficient that a drawing speed of 30%/s or less is achieved in any of the machine direction and the transverse direction. It is preferable to achieve a drawing speed of 30%/s or less during the preceding drawing in the machine direction from the viewpoint of decreasing the pressure loss while sufficiently ensuring the thickness. When the drawing in the machine direction is performed in two stages at different drawing speeds, it is preferable that the drawing is performed at a drawing speed of 30%/s or less in the drawing direction in any of the two stages. Furthermore, in the case where drawing is simultaneously performed in the machine direction and the transverse direction in a plane using a table test apparatus or the like, it is preferable to achieve a drawing speed of 30%/s or less in any of the machine direction and the transverse direction. The drawing speed can be set to, for example, 1%/s or more in the drawing direction regardless of the machine direction and the transverse direction.

The drawing speed is a value obtained by dividing a drawing ratio (%) by the time (second) required for the drawing. The drawing ratio (%) is a ratio of the length after drawing to the length before drawing (length after drawing/length before drawing). The drawing speed is preferably decreased as described above because the pressure loss of the porous membrane to be obtained can be further decreased.

From the viewpoint of increasing the thickness of the obtained fluororesin porous membrane and further decreasing the pressure loss, it is preferable to perform the heat treatment on the rolled product before the drawing and furthermore perform drawing at a low speed as described above.

In the case of biaxial drawing, the temperature during the drawing in the first direction is preferably 200° C. or higher and 300° C. or lower and more preferably 230° C. or higher and 270° C. or lower. The temperature during the drawing in the second direction is preferably 200° C. or higher and 300° C. or lower and more preferably 250° C. or higher and 290° C. or lower.

When the rolled product (also referred to as an unfired fluororesin product) is drawn, the temperature, the drawing ratio, and the drawing speed during the drawing are known to affect the physical properties of a drawn product. The S-S curve (a graph illustrating the relationship between tensile force and elongation) of the unfired fluororesin product shows unique characteristics different from those of other resins. Normally, the tensile force of resin materials increases as the elongation increases. In most cases, for example, the elastic region and the breaking point are different depend on the material and the evaluation conditions whereas the tensile force tends to increase as the elongation increases. In contrast, the unfired fluororesin product has a tensile force that shows a peak at a particular elongation and then tends to gradually decrease. This shows that unfired fluororesin products have a "region in which portions not subjected to drawing are stronger than portions subjected to drawing".

When this is applied to the behavior during drawing, in the case of a general resin, the weakest portion in the drawing plane starts to draw during drawing, but the drawn portion becomes stronger than the undrawn portion. Therefore, the next weaker undrawn portion is drawn, whereby the drawn region expands and the entire film is drawn. On the other hand, in the case of the unfired fluororesin product, when the portion that starts to draw reaches the "region in which portions not subjected to drawing are stronger than portions subjected to drawing", the portion that has already been drawn is further drawn. As a result, the undrawn portion remains as a node (nodal portion, undrawn portion). As the drawing speed decreases, this phenomenon becomes noticeable and larger nodes (nodal portions, undrawn portions) are left. By using this phenomenon during drawing, the physical properties of a drawn body are adjusted in accordance with various applications.

For the fluororesin porous membrane according to the present embodiment, a drawn body having a lower density is preferably obtained, and it is effective to apply a low drawing speed particularly to first drawing in the case of biaxial drawing. Herein, when large nodes (nodal portions, undrawn portions) are left and a non-fibrillatable non-melt-fabricable component is used, the above-described phenomenon due to a low drawing speed becomes more noticeable compared with the case where only known PTFE is used as a raw material. Even when a molded body having a large thickness is intended to be obtained, the drawing speed can be increased compared with the case where only PTFE is used as a raw material.

The thus-obtained porous membrane is preferably subjected to heat setting to achieve mechanical strength and dimensional stability. The temperature during the heat setting may be a temperature higher than or equal to the melting point of PTFE or lower than the melting point of PTFE and is preferably 250° C. or higher and 400° C. or lower.

The fluororesin porous membrane may have a single-layer structure or may have a multilayer structure in which a first fluororesin porous membrane and a second fluororesin porous membrane are stacked. The content of the liquid lubricant used in the production is preferably 25 parts by weight or more and 35 parts by weight or less relative to 100 parts by weight of the fluororesin. When the content is 25 parts by weight or more, the pressure loss can be decreased, which easily adjusts the pressure loss of the whole filter medium to 80 Pa or less. When the content is 35 parts by weight or less, the moldability of an unfired film (raw tape) can be ensured. This can suppress an excessively high load on the second fluororesin porous membrane on the downstream side caused when fine particles pass through the first fluororesin porous membrane having an excessively increased pore size toward the downstream side without being collected.

In particular, the content of the liquid lubricant used in the production of the first fluororesin porous membrane is, for example, preferably 30 parts by weight or more and 35 parts by weight or less relative to 100 parts by weight of the fluororesin. For example, the dust-holding capacity of the filter medium can be greatly increased by using 30 parts by weight or more and 35 parts by weight or less of the liquid lubricant for producing the first fluororesin porous membrane while 26 parts by weight or more and 31 parts by weight or less of the liquid lubricant for producing the second fluororesin porous membrane while a liquid lubricant content difference of 1 to 4 parts by weight is satisfied.

The differentiation in mean pore size between the first fluororesin porous membrane and the second fluororesin porous membrane may be achieved by differentiating the mixing ratio of the three components between the two porous membranes.

(3) Air-Permeable Supporting Member

The air-permeable supporting member is disposed on the upstream side or the downstream side with respect to the fluororesin porous membrane or on both the upstream side and the downstream side so as to support the fluororesin porous membrane. Therefore, even if it is difficult for the fluororesin porous membrane to stand on its own because of its small thickness or the like, the support of the air-permeable supporting member allows the fluororesin porous membrane to stand. Furthermore, the strength as an air filter medium is ensured. Even when the air filter medium is folded into a specific shape, the shape is easily maintained.

Non-limiting examples of the material and structure of the air-permeable supporting member include nonwoven fabric, woven fabric, and resin net. In particular, a nonwoven fabric having heat fusibility is preferred from the viewpoint of strength, collectability, flexibility, and workability. For the material for nonwoven fabric, it is preferable to use, for example, a polyolefin such as polyethylene (PE) or polypropylene (PP), a polyester such as polyethylene terephthalate (PET), or a composite material of the foregoing as a main component from the viewpoint that penetrability of a chemical agent is favorable and a change in shape or deterioration of the air-permeable supporting member is suppressed without dissolving the air-permeable supporting member in the case of performing a disinfection treatment using a chemical solution.

The nonwoven fabric is preferably a nonwoven fabric in which some or all of constituent fibers have a core/sheath structure, a two-layer nonwoven fabric including a fiber layer formed of a low-melting-point material and a fiber layer formed of a high-melting-point material, or a nonwoven fabric whose surface is coated with a heat fusible resin. Such a nonwoven fabric is, for example, a spun-bonded nonwoven fabric. The nonwoven fabric having a core/sheath structure is preferably a nonwoven fabric in which the core component has a higher melting point than the sheath component. Examples of the combination of materials for the core/sheath include PET/PE and high-melting-point polyester/low-melting-point polyester. Examples of the combination of the low-melting-point material/high-melting-point material for the two-layer nonwoven fabric include PE/PET, PP/PET, and low-melting-point PET/high-melting-point PET. An example of the nonwoven fabric whose surface is coated with a heat fusible resin is a PET nonwoven fabric whose surface is coated with an olefin resin.

The air-permeable supporting member can be joined to the fluororesin porous membrane by using an anchor effect due to partial melting of the air-permeable supporting member through heating or due to melting of a hot-melt resin, or by using adhesion of a reactive adhesive or the like.

The air-permeable supporting member has a pressure loss, a collection efficiency, and a dust-holding capacity much lower than those of the above-described fluororesin porous membrane. The pressure loss, the collection efficiency, and the dust-holding capacity may be values considered to be substantially zero. The pressure loss of the air-permeable supporting member is, for example, preferably 10 Pa or less, more preferably 5 Pa or less, and further preferably 1 Pa or less. The collection efficiency of the air-permeable supporting member may be, for example, a value considered to be substantially zero or about zero.

The thickness of the air-permeable supporting member is, for example, preferably 500 or less and more preferably 300 µm or less. When the fluororesin porous membrane is folded and used in a pleated shape, the thickness of the air-permeable supporting member is preferably 200 or more from the viewpoint of easily maintaining the pleated shape.

(4) Pleated Filter Medium

The pleated filter medium according to the present embodiment is obtained by processing (pleating) the above-described air filter medium into a zigzag shape in which mountain folds and valley folds are alternately repeated so that the filter medium surfaces face each other to form a pleated portion, whereby the entire filter medium has a substantially rectangular parallelepiped shape in which the mountain fold portions constitute a windward surface and the valley fold portions constitute a leeward surface. Alternatively, the pleated mask filter medium may have a concentric pleated shape in which a plurality of mountain fold portions is provided on the windward side in a concentric manner and a plurality of valley fold portions is provided on the leeward side in a concentric manner.

The pleated filter medium may be, for example, a pleated mask filter medium used for a mask that covers the nose or mouth of a human.

Figure 4:
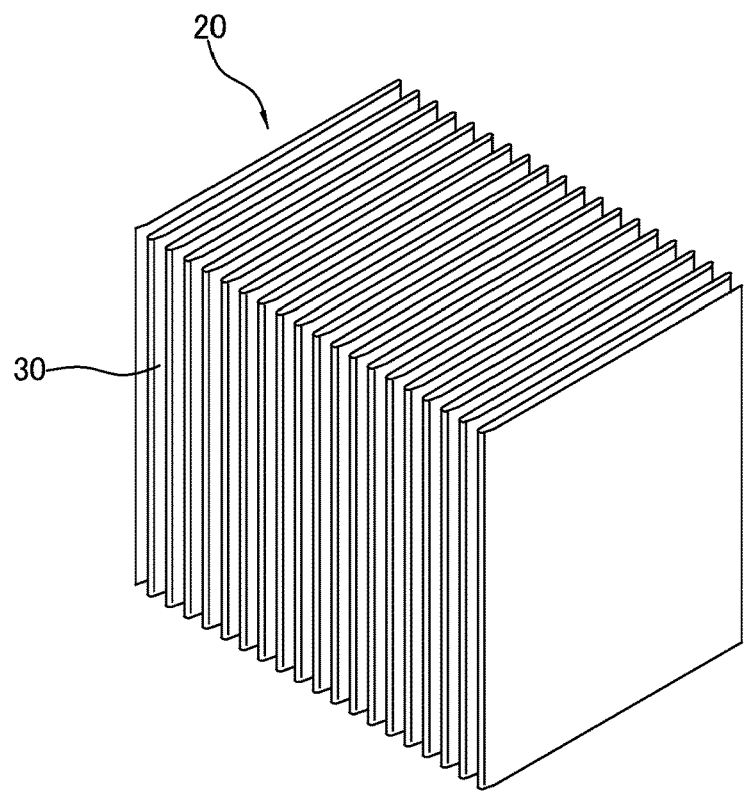
FIG. 4 is an external perspective view of a pleated filter medium.
Figure 5:
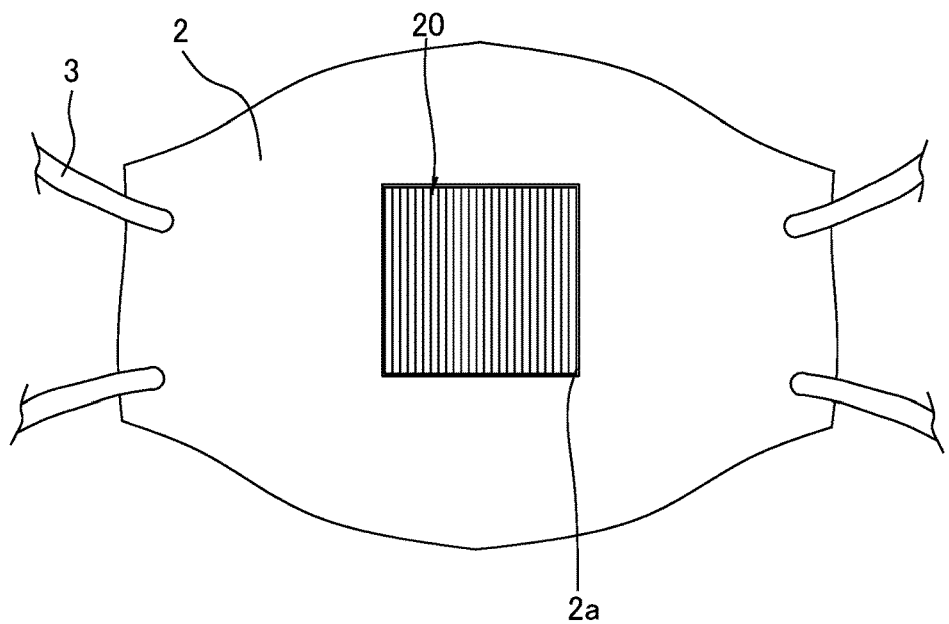
FIG. 5 is a front view of a pleated filter medium being attached to a base.

FIG. 4 is an external perspective view of an example of the pleated filter medium according to the present embodiment. FIG. 5 is a front view of a pleated filter medium for masks in a state of being attached to a base, and FIG. 6 is a side sectional view of the pleated filter medium for masks in a state of being attached to a base.

Figure 6:
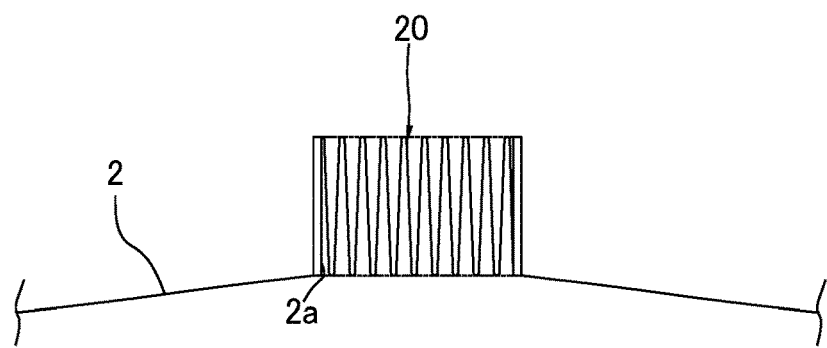
FIG. 6 is a side sectional view of a pleated filter medium being attached to a base.

As illustrated in FIGS. 4 to 6, the pleated filter medium may be a pleated filter medium 20 used by being attached to an opening 2a of a base 2 made of a resin or the like having no filtration function. The pleated filter medium 20 is more preferably used by being attached to a base 2 having a filter medium replaceable attachment opening 2a. The base 2 may be provided with straps 3 for hooking over the ears.

The fold height, which is a distance between a mountain fold portion and a valley fold portion adjacent to each other of the pleated filter medium, is preferably 10 mm or more and 40 mm or less. By setting the fold height to be 10 mm or more, it is possible to facilitate a folding process when forming mountain fold portions and valley fold portions of the air filter medium. By setting the fold height to be 40 mm or less, it is possible to suppress an increase in pressure loss due to the pleated structure of the pleated filter medium.

The pleat interval, which is a distance between adjacent mountain fold portions or adjacent valley fold portions of the pleated filter medium, is preferably 2.0 mm or more and 4.5 mm or less. When the pleat interval is 2.0 mm or more, an increase in pressure loss due to the pleated structure can be suppressed. When the pleat interval is 4.5 mm or less, the total area of the air filter medium that can be used for pleated filter media can be sufficiently increased.

The interval between filter medium surfaces facing each other in the pleated filter medium may be ensured, for example, by using a separator such as a hot-melt resin serving as an interval holding member, or by using protrusions formed by embossing the filter medium surfaces. The pleated filter medium may be a simply folded medium without using a separator or performing embossing. Even in this case, the airflow can pass between the mountain fold portions on the windward side.

The area of the windward surface of the pleated filter medium attached to the opening formed in the base can be set to, for example, 22 $cm^2$ or more and 61 $cm^2$ or less. In the case where the windward surface is rectangular, for example, the diagonal line may have a length of 4.5 cm or more and 11 cm or less.

The total area of the pleated filter medium is preferably 200 $cm^2$ or more and more preferably 300 $cm^2$ or more from the viewpoint of easily maintaining a low pressure loss even after the collection target is held to some extent, and of also easily maintaining a good collection efficiency. The total area of the pleated filter medium is preferably 1300 $cm^2$ or less from the viewpoint that the area and fold height of the windward surface of the pleated filter medium are reasonable for use and an effective pleat interval is realized.

When air containing polyalphaolefin particles having a number median diameter of 0.25 µm is continuously passed through the pleated filter medium at a flow rate of 85 L/min to apply a load of 200 mg of the polyalphaolefin particles, the pressure loss given when the air is passed through the filter medium at a flow rate of 40 L/min is preferably 120 Pa or less, more preferably 100 Pa or less, and further preferably 80 Pa or less. As a result, even after continuous use, it is possible to make the user hardly feel breathing difficulty during use.

(5) Air Filter Unit

Figure 7:
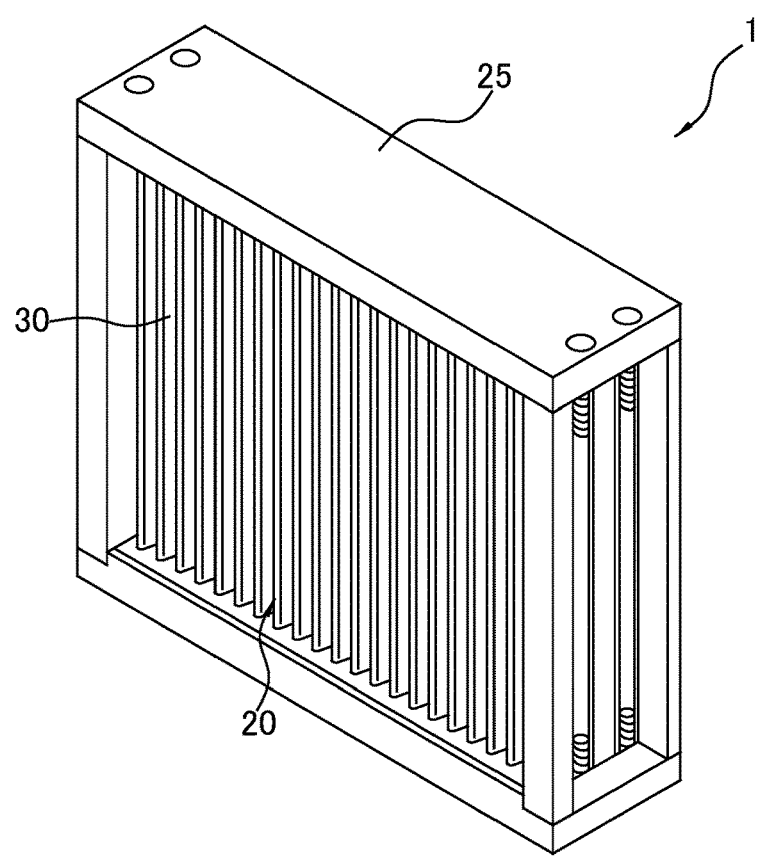
FIG. 7 is an external perspective view of an air filter unit.

Next, an air filter unit 1 will be described with reference to FIG. 7.

The air filter unit 1 includes the above-described pleated filter medium 20 and a frame body accommodating the pleated filter medium 20.

The frame body 25 is produced by, for example, assembling boards such as resin or metal boards, and the pleated filter medium 20 and the frame body 25 are preferably sealed with each other using a sealer. The sealer is used to prevent leakage between the pleated filter medium 20 and the frame body 25 and is formed of, for example, a resin such as an epoxy resin, an acrylic resin, or a urethane resin.

The air filter unit 1 including the pleated filter medium 20 and the frame body 25 may be a mini-pleat air filter unit in which a single pleated filter medium 20 extending in a flat-plate form is held so as to be accommodated inside the frame body 25 or may be a V-bank air filter unit or a single header air filter unit in which a plurality of pleated filter media extending in a flat-plate form are arranged and held in the frame body.

(6) Use of Air Filter Media

The air filter medium according to the present embodiment can be used as an air filter medium to be reused by a disinfection treatment because the performance is less likely to deteriorate even when the disinfection treatment for reducing the number of collected bacteria or viruses or removing the collected bacteria or viruses is performed.

More specifically, the air filter medium can be at least one of an air filter medium reused by a disinfection treatment through exposure to an alcohol, an air filter medium reused by a disinfection treatment through exposure to a surfactant, an air filter medium reused by a disinfection treatment through exposure to a chlorine-based bleaching agent, an air filter medium reused by a disinfection treatment through exposure to a hypochlorous acid solution, an air filter medium reused by a disinfection treatment through exposure to a hydrogen peroxide solution, an air filter medium reused by a disinfection treatment through exposure to a temperature environment of 75° C. or higher and 150° C. or lower, an air filter medium reused by a disinfection treatment through irradiation with ultraviolet rays, and an air filter medium reused by a disinfection treatment through exposure to ozone.

Since the air filter medium has a low pressure loss, the air filter medium is preferably used for masks from the viewpoint of being able to reduce breathing difficulty during use.

The mask is preferably a mask that suppresses entry of dust, oil smoke, bacteria, viruses, and the like into the human body through the mouth or nose.

The type of the mask may be a general-purpose mask, a dust-proof mask, or a medical mask. The form of the mask may be any of a flat type, a pleated type, and a three-dimensional type. The pleated mask may be used in a state in which a folded pleat portion is stretched out. The three-dimensional mask may have a beak shape that is tapered toward the front side.

(7) Method for Regenerating Air Filter Medium

The method for regenerating an air filter medium according to the present embodiment includes a step of preparing an air filter medium including a fluororesin porous membrane and a supporting member stacked on top of each other, and a step of subjecting the fluororesin porous membrane to a disinfection treatment.

In this regeneration method, the permeability ratio (permeability after disinfection treatment/permeability before disinfection treatment), which is a ratio of the permeability of an air filter medium after a disinfection treatment of a fluororesin porous membrane as determined using NaCl particles having a particle size of 0.1 μm to the permeability of the air filter medium before the disinfection treatment of the fluororesin porous membrane as determined using NaCl particles having a particle size of 0.1 μm is 5.0 or less.

In this regeneration method, the pressure loss ratio (pressure loss after disinfection treatment/pressure loss before disinfection treatment), which is a ratio of the pressure loss of an air filter medium after the disinfection treatment of a fluororesin porous membrane as determined when air is passed at a flow rate of 5.3 cm/s to the pressure loss of the air filter medium before the disinfection treatment of the fluororesin porous membrane as determined when air is passed at a flow rate of 5.3 cm/s, is 0.83 or more and 1.15 or less.

According to the regeneration method, the air filter medium can be reused with a small decrease in performance even when a disinfection treatment for reducing or removing viruses and bacteria adhering to the air filter medium is performed.

(8) Disinfection Treatment

The disinfection treatment for the air filter medium is not limited as long as the disinfection treatment is a treatment capable of reducing the number of or removing at least one of bacteria and viruses adhering to the air filter medium. Such a disinfection treatment is, for example, a treatment in which at least one of an alcohol, a surfactant, a chlorine-based bleaching agent, a hypochlorous acid solution, a hydrogen peroxide solution, a high-temperature environment, ultraviolet rays, and ozone is allowed to act on the air filter medium.

Since the fluororesin porous membrane mainly retains bacteria and viruses in the air filter medium, the disinfection treatment may be performed on the fluororesin porous membrane instead of the entire air filter medium.

Among these disinfection treatments, when the air filter medium is treated with a fluid such as an alcohol, a surfactant, a chlorine-based bleaching agent, a hypochlorous acid solution, or a hydrogen peroxide solution, it is desirable that the fluid enters the inside of the air filter medium to obtain a disinfection effect to the inside. In this case, the air filter medium preferably has good liquid penetrability. For example, the air filter medium is preferably an air filter medium into which a droplet of a mixed liquid of isopropyl alcohol and water at a volume ratio of 60:40 penetrates when being allowed to stand for 30 seconds. Considering that bacteria and viruses are mainly retained in the fluororesin porous membrane, the fluororesin porous membrane preferably has the above-mentioned penetrability. For glass filter media constituted by glass fibers, which are known filter media, the mechanical strength is considerably decreased when the glass media are wetted with a liquid. For fluororesin filter media constituted by a fluororesin porous membrane and a supporting member, in contrast, the mechanical strength is easily maintained even when the fluororesin filter media are wetted with a liquid during the disinfection treatment. For electret filter media, which are known filter media, static electricity disappears when a disinfection treatment using a liquid is performed, and the collection efficiency is considerably decreased. For fluororesin filter media constituted by a fluororesin porous membrane and a supporting member, in contrast, a decrease in performance is suppressed even when the fluororesin filter media are wetted with a liquid during the disinfection treatment.

For the air filter medium, a fluororesin porous membrane made of a fluororesin having high chemical resistance is used. Therefore, even when such a disinfection treatment is performed, a decrease in performance can be suppressed. In particular, the air filter medium including a fluororesin porous membrane is excellent in performance maintenance characteristics after a disinfection treatment using an alcohol and a surfactant among the disinfection treatments, as compared with an air filter medium including a known electret melt-blown membrane.

(8-1) Alcohol

Examples of the disinfection treatment using an alcohol include impregnation of the air filter medium with an alcohol and spraying of an alcohol onto the air filter medium. The type of alcohol is, for example, ethanol. The concentration of the alcohol may be, for example, 60 wt % or more and 99 wt % or less, and is preferably 70 wt % or more and 95 wt % or less. The disinfection treatment using an alcohol may be performed such that the surface and the inside of the air filter medium are kept sufficiently wet for, for example, 20 seconds or longer.

(8-2) Surfactant

Examples of the disinfection treatment using a surfactant include impregnation of the air filter medium with a liquid containing a surfactant and spraying of a liquid containing a surfactant onto the air filter medium. Non-limiting examples of the surfactant include sodium linear alkylbenzene sulfonate (0.1 wt % or more), alkyl glycoside (0.1 wt % or more), alkylamine oxide (0.05 wt % or more), benzalkonium chloride (0.05 wt % or more), benzethonium chloride (0.05 wt % or more), dialkyldimethylammonium chloride (0.01 wt % or more), polyoxyethylene alkyl ether (0.2 wt % or more), pure soap (fatty acid potassium) (0.24 wt % or more), and pure soap (fatty acid sodium) (0.22 wt % or more), and combinations of the foregoing. Herein, the numerical value in parentheses indicates a lower limit of the preferred content. The disinfection treatment using a surfactant may be performed such that the surface and the inside of the air filter medium are kept sufficiently wet for, for example, 20 seconds or longer, or may be performed within one minute.

(8-3) Chlorine-Based Bleaching Agent

Examples of the disinfection treatment using a chlorine-based bleaching agent include impregnation of the air filter medium with a liquid containing a chlorine-based bleaching agent and spraying of a liquid containing a chlorine-based bleaching agent onto the air filter medium. The type of chlorine-based bleaching agent is, for example, sodium hypochlorite. The concentration of the chlorine-based bleaching agent may be, for example, 0.01 wt % or more and 7.0 wt % or less, and is more preferably 0.05 wt % or more and 6.0 wt % or less. The disinfection treatment using a chlorine-based bleaching agent may be performed such that the surface and the inside of the air filter medium are kept sufficiently wet for, for example, 20 seconds or longer, or may be performed within one hour.

(8-4) Hypochlorous Acid Solution

Examples of the disinfection treatment using a hypochlorous acid solution include impregnation of the air filter medium with a liquid containing hypochlorous acid and spraying of a liquid containing hypochlorous acid onto the air filter medium. The concentration of the hypochlorous acid may be, for example, 30 ppm or more, is preferably 35 ppm or more and more preferably 50 ppm or more, and may be 200 ppm or more in terms of effective chlorine weight concentration. The upper limit of the concentration of the hypochlorous acid may be, for example, 200 ppm in terms of effective chlorine weight concentration. The disinfection treatment using a hypochlorous acid solution may be performed such that the surface and the inside of the air filter medium are kept sufficiently wet for, for example, 20 seconds or longer, or may be performed within one hour.

(8-5) Hydrogen Peroxide Solution

Examples of the disinfection treatment using a hydrogen peroxide solution include impregnation of an air filter medium with a liquid containing a hydrogen peroxide solution. The concentration of the hydrogen peroxide solution may be, for example, 2.5 w/v % or more and 3.5 w/v % or less. Such a hydrogen peroxide solution is used for disinfection of wounds, ulcer sites, and the like and is known as oxydol. Note that w/v % is weight/volume % and indicates the number of grams of hydrogen peroxide in 100 ml of a solution. The disinfection treatment using a hydrogen peroxide solution may be performed such that the surface and the inside of the air filter medium are kept sufficiently wet for, for example, 1 minute or longer, preferably 10 minutes or longer, and more preferably 30 minutes or longer. The disinfection treatment may be performed within 5 hours, and more preferably within 3 hours.

(8-6) High-Temperature Environment

Examples of the disinfection treatment using a high-temperature environment include impregnation of the air filter medium with a high-temperature fluid and spraying of a high-temperature fluid onto the air filter medium. Examples of the fluid include air, water, and water vapor.

The temperature of the high-temperature fluid may be, for example, 75° C. or higher and 150° C. or lower. The temperature of the high-temperature fluid is preferably, for example, 80° C. or higher. The temperature of the high-temperature fluid is preferably 135° C. or lower and more preferably 125° C. or lower, and may be, for example, 121° C. The disinfection treatment using a high-temperature environment may be continued for, for example, 1 minute or longer, preferably 10 minutes or longer, more preferably 60 minutes or longer such that the temperatures of the surface and the inside of the air filter medium are sufficiently increased. The disinfection treatment using a high-temperature environment may be performed, for example, within 2 hours.

Examples of the disinfection treatment using a high-temperature environment include an autoclave treatment, a high-temperature air heating treatment, and an autoclave treatment for an air filter medium sealed in an aluminum bag. The autoclave treatment is a disinfection treatment using high-temperature and high-pressure water vapor. The pressure of the water vapor in the autoclave treatment may be, for example, 1.5 atm or more and is preferably 2.0 atm or more. The high-temperature air heating treatment is a disinfection treatment in which the air filter medium is exposed to a high-temperature dry air environment. In the autoclave treatment for an air filter medium sealed in an aluminum bag, the air filter medium can be disinfected without being in direct contact with water vapor.

(8-7) Ultraviolet Ray

The disinfection treatment using ultraviolet rays is performed by irradiating the air filter medium with light having a wavelength in the ultraviolet region. The irradiation time may be, for example, 1 minute or longer and 1 hour or shorter, or 5 minutes or longer and 30 minutes or shorter.

(8-8) Ozone

Examples of the disinfection treatment using ozone include exposure of the air filter medium to ozone. The concentration of ozone may be, for example, 1 ppm or more and 100 ppm or less, is preferably 5 ppm or more and 50 ppm or less, and may be 10 ppm. The exposure time may be, for example, 10 minutes or longer and 100 hours or shorter, is preferably 1 hour or longer and 70 hours or shorter, and may be 2 hours.

(9) Others

Each of the permeability and pressure loss of the air filter medium can be values in a non-charged state in which the fluororesin porous membrane is not charged. Note that the air filter medium in a non-charged state refers to an air filter medium in a state in which electrification is not caused by being subjected to a static elimination treatment conforming to "JIS B 9908-4, Part 4: Test Method for Static Elimination Treatment of Ventilating Air Filter Unit". As compared with electret filters or the like, even when the fluororesin porous membrane changes from a charged state to a non-charged state, a decrease in collection efficiency is suppressed and the collection efficiency is maintained.

The permeability before disinfection treatment is not limited, and may be a permeability of an initial air filter medium before use or may be a permeability of an air filter medium after use and immediately before disinfection treatment. However, a lower one of these permeabilities is preferably used as the "permeability before disinfection treatment".

The pressure loss before disinfection treatment is not limited, and may be a pressure loss of an initial air filter medium before use or may be a pressure loss of an air filter medium after use and immediately before disinfection treatment. However, a lower one of these pressure losses is preferably used as the "pressure loss before disinfection treatment".

Each of the pressure loss, collection efficiency, and PF of the air filter medium can be values in a non-charged state in which the fluororesin porous membrane is not charged.

The mask is, for example, a filter medium used so as to cover at least one of a nose and a mouth of a human.

The dust-holding capacity of the air filter medium can be a value in a non-charged state in which the fluororesin porous membrane is not charged.

The supporting member may be formed of only any of polyethylene terephthalate, polyethylene, polypropylene, and a composite material of the foregoing.

The use of an air filter medium in terms of the appendix is a use of an air filter medium that includes a fluororesin porous membrane and a supporting member stacked on top of each other and that is reused by performing a disinfection treatment after use. The permeability ratio (permeability after disinfection treatment/permeability before disinfection treatment), which is a ratio of the permeability of the air filter medium after disinfection treatment of the fluororesin porous membrane to the permeability of the air filter medium before disinfection treatment of the fluororesin porous membrane, is 5.0 or less. The pressure loss ratio (pressure loss after disinfection treatment/pressure loss before disinfection treatment), which is a ratio of the pressure loss of the air filter medium after disinfection treatment of the fluororesin porous membrane as determined when air is passed at a flow rate of 5.3 cm/s to the pressure loss of the air filter medium before disinfection treatment of the fluororesin porous membrane as determined when air is passed at a flow rate of 5.3 cm/s, is 0.83 or more and 1.15 or less.

EXAMPLES

Hereafter, the present disclosure will be specifically described based on Examples and Comparative Examples.

Example 1

The FP raw material for the fluororesin porous membrane used for the air filter medium in Example 1 was a mixed powder constituted by three components (fibrillatable PTFE (A component), non-fibrillatable non-melt-fabricable component (B component), and non-fibrillatable melt-fabricable component (C component) having a melting point of lower than 320° C.).

More specifically, 66.5 wt % (in terms of polymer) of a PTFE aqueous dispersion body (A component) having an SSG of 2.160 and prepared by the method described in Comparative Example 3 in International Publication No. 2005/061567, 28.5 wt % (in terms of polymer) of a low-molecular-weight PTFE aqueous dispersion body (B component) having a melt viscosity of 20000 Pa·s as measured by a flow tester method at 380° C. and prepared by the method described in International Publication No. 2009/020187, and 5 wt % (in terms of polymer) of an FEP aqueous dispersion body (C component) having a melting point of 215° C. and prepared by the method described in Japanese Unexamined Patent Application Publication No. 2010-235667 were mixed with each other. As a coagulant, 500 ml of a 1% aqueous aluminum nitrate solution was added thereto, and stirring was performed to cause co-coagulation. The resulting powder was strained through a strainer to remove water and then further dried in a hot-air drying furnace at 135° C. for 18 hours to obtain a mixed powder of the above three components.

Subsequently, 27.0 parts by weight (27.0 parts by weight relative to 100 parts by weight of the mixed powder) of a hydrocarbon oil ("IP Solvent 2028" manufactured by Idemitsu Kosan Co., Ltd.) serving as an extrusion liquid lubricant was added to and mixed with 100 parts by weight of the mixture at 20° C. Then, the resulting mixture was extruded using a paste extruder to obtain a sheet-shaped molded body. The sheet-shaped molded body was molded into a film using a calendar roll heated to 70° C. to obtain a PTFE film. The resulting film was passed through a hot-air drying furnace at 250° C. to evaporate and remove the hydrocarbon oil, thereby obtaining a belt-shaped unfired PTFE film (raw tape) having an average thickness of 200 μm and an average width of 150 mm. Subsequently, the unfired PTFE film was drawn at a predetermined drawing speed (13.8%/s) in the longitudinal direction (MD direction) at a predetermined drawing ratio (7.5 times) in a predetermined temperature environment (250° C.). Subsequently, the drawn unfired film was drawn at a predetermined drawing speed (330%/s) in the width direction (TD direction) at a predetermined drawing ratio (45 times) in a predetermined temperature environment (288° C.) using a tenter capable of clipping the drawn unfired film, and was subjected to heat setting at 390° C. Thus, a fluororesin porous membrane was obtained.

Air-permeable supporting members were thermally fused to both the upstream side and the downstream side of the fluororesin porous membrane, thereby obtaining an air filter medium of Example 1 having a flat shape. The air-permeable supporting members were each a spun-bonded nonwoven fabric (average fiber diameter 24 μm, basis weight 30 g/m$^2$, thickness 0.2 mm) formed of fibers having a core/sheath structure in which PET was used for the core and PE was used for the sheath (the collection efficiency could be considered to be substantially zero or about zero).

The coefficient of variation of the pressure loss in the air filter medium of Example 1 obtained as described above was 4.1. The dust-holding capacity of the polyalphaolefin particles in the air filter medium of Example 1 was 17 g/m$^2$.

Samples of the air filter medium of Example 1 were cut out from the same filter medium roll of Example 1, and the samples were subjected to disinfection treatments described later. For the coefficient of variation of pressure loss and the dust-holding capacity of the polyalphaolefin particles, the values measured for the same filter medium roll of Example 1 are shown as values common to the samples.

Example 2

The FP raw material for the fluororesin porous membrane used for the air filter medium in Example 2 was a mixed powder constituted by three components (fibrillatable PTFE (A component), non-fibrillatable non-melt-fabricable component (B component), and non-fibrillatable melt-fabricable component (C component) having a melting point of lower than 320° C.).

More specifically, 66.5 wt % (in terms of polymer) of a PTFE aqueous dispersion body (A component) having an SSG of 2.160 and prepared by the method described in Comparative Example 3 in International Publication No. 2005/061567, 28.5 wt % (in terms of polymer) of a low-molecular-weight PTFE aqueous dispersion body (B component) having a melt viscosity of 20000 Pa·s as measured by a flow tester method at 380° C. and prepared by the method described in International Publication No. 2009/020187, and 5 wt % (in terms of polymer) of an FEP aqueous dispersion body (C component) having a melting point of 215° C. and prepared by the method described in Japanese Unexamined Patent Application Publication No. 2010-235667 were mixed with each other. As a coagulant, 500 ml of a 1% aqueous aluminum nitrate solution was added thereto, and stirring was performed to cause co-coagulation. The resulting powder was strained through a strainer to remove water and then further dried in a hot-air drying furnace at 135° C. for 18 hours to obtain a mixed powder of the above three components.

Subsequently, 29.0 parts by weight (29.0 parts by weight relative to 100 parts by weight of the mixed powder) of a hydrocarbon oil ("IP Solvent 2028" manufactured by Idemitsu Kosan Co., Ltd.) serving as an extrusion liquid lubricant was added to and mixed with 100 parts by weight of the mixture at 20° C. Then, the resulting mixture was extruded using a paste extruder to obtain a sheet-shaped molded body. The sheet-shaped molded body was molded into a film using a calendar roll heated to 70° C. to obtain a PTFE film. The resulting film was passed through a hot-air drying furnace at 250° C. to evaporate and remove the hydrocarbon oil, thereby obtaining a belt-shaped unfired PTFE film (first raw tape) having an average thickness of 300 μm and an average width of 150 mm.

A belt-shaped unfired PTFE film (second raw tape) having an average thickness of 300 and an average width of 150 mm was obtained in the same manner as the first raw tape, except that the liquid lubricant was mixed in an amount of 33.0 parts by weight.

Subsequently, the first raw tape and the second raw tape were stacked and drawn at a predetermined drawing speed (13.8%/s) in the longitudinal direction (MD direction) at a predetermined drawing ratio (6.7 times) in a predetermined temperature environment (250° C.). Subsequently, the drawn unfired film was drawn at a predetermined drawing speed (280%/s) in the width direction (TD direction) at a predetermined drawing ratio (11.5 times) in a predetermined temperature environment (288° C.) using a tenter capable of clipping the drawn unfired film, and was subjected to heat setting at 390° C. Thus, a fluororesin porous membrane was obtained.

Air-permeable supporting members were thermally fused to both the upstream side and the downstream side of the fluororesin porous membrane, thereby obtaining an air filter medium of Example 2 having a flat shape. The air-permeable supporting members were each a spun-bonded nonwoven fabric (average fiber diameter 24 basis weight 40 g/m$^2$, thickness 0.2 mm) formed of fibers having a core/sheath structure in which PET was used for the core and PE was used for the sheath (the collection efficiency could be considered to be substantially zero or about zero).

The coefficient of variation of the pressure loss in the air filter medium of Example 2 obtained as described above was 4.8. The dust-holding capacity of the polyalphaolefin particles in the air filter medium of Example 2 was 28 g/m$^2$.

Samples of the air filter medium of Example 2 were also cut out from the same filter medium roll of Example 2 in the same manner as in Example 1, and the samples were subjected to disinfection treatments described later. For the coefficient of variation of pressure loss and the dust-holding capacity of the polyalphaolefin particles, the values measured for the same filter medium roll of Example 2 are shown as values common to the samples.

Example 3

In Example 3, a belt-shaped unfired fluororesin film having an average thickness of 300 and an average width of 150 mm was obtained in the same manner as the first raw tape in Example 2, except that the liquid lubricant was mixed in an amount of 31 parts by weight. Then, this single first raw tape was drawn in the same manner as in Example 2 to obtain a fluororesin porous membrane. Air-permeable supporting members were thermally fused to both the upstream side and the downstream side of the single fluororesin porous membrane in the same manner as in Example 2, thereby obtaining an air filter medium of Example 3. The air-permeable supporting members were each a spun-bonded nonwoven fabric (average fiber diameter 24 basis weight 40 g/m$^2$, thickness 0.2 mm) formed of fibers having a core/sheath structure in which PET was used for the core and PE was used for the sheath (the collection efficiency could be considered to be substantially zero or about zero).

The coefficient of variation of the pressure loss in the air filter medium of Example 3 obtained as described above was 5.4. The dust-holding capacity of the polyalphaolefin particles in the air filter medium of Example 3 was 19 g/m$^2$.

Samples of the air filter medium of Example 3 were also cut out from the same filter medium roll of Example 3 in the same manner as in Example 1, and the samples were subjected to disinfection treatments described later. For the coefficient of variation of pressure loss and the dust-holding capacity of the polyalphaolefin particles, the values measured for the same filter medium roll of Example 3 are shown as values common to the samples.

(Disinfection Treatment)

For Examples 1 to 3 described above, various disinfection treatments described below were performed, and the physical properties before and after the disinfection treatments were measured.

A disinfection treatment using a surfactant, a disinfection treatment using an alcohol, a disinfection treatment using sodium hypochlorite, a disinfection treatment using a hypochlorous acid solution, a disinfection treatment using 85° C. hot water, a disinfection treatment by an autoclave treatment, a disinfection treatment by a high-temperature air heating treatment, a disinfection treatment by an autoclave treatment in a state of being sealed in an aluminum bag, a disinfection treatment by irradiation with ultraviolet rays, a disinfection treatment using a hydrogen peroxide solution, and a disinfection treatment using ozone were performed as described below.

In the disinfection treatment using a surfactant, a liquid diluted with water so that polyoxyethylene alkyl ether serving as an active component had a concentration of 0.2 wt % or more was sprayed onto both surfaces of the air filter medium six times, and then air-drying was performed. The amount of the liquid sprayed was 1.5 g with respect to the diameter 60 mm of the air filter medium.

In the disinfection treatment using an alcohol, 80 wt % of ethanol was sprayed onto both surfaces of the air filter medium six times, and then air-drying was performed. The amount of the liquid sprayed was 1.5 g with respect to the diameter 60 mm of the air filter medium.

In the disinfection treatment using sodium hypochlorite, a liquid having a sodium hypochlorite concentration of 0.05 wt % was sprayed onto both surfaces of the air filter medium six times, and then air-drying was performed. The amount of the liquid sprayed was 1.5 g with respect to the diameter 60 mm of the air filter medium.

In the disinfection treatment using a hypochlorous acid solution, a liquid whose concentration of the hypochlorous acid solution was 50 ppm was sprayed onto both surfaces of the air filter medium six times, and then air-drying was performed. The amount of the liquid sprayed was 1.5 g with respect to the diameter 60 mm of the air filter medium.

In the disinfection treatment using 85° C. hot water, a disinfection treatment of immersing the air filter medium in 85° C. hot water for 10 minutes and a disinfection treatment of immersing the air filter medium in 85° C. hot water for 60 minutes were performed.

In the disinfection treatment by an autoclave treatment, a disinfection treatment of exposing the air filter medium to a high-temperature water vapor environment at 121° C. (corresponding to a gauge pressure of 103 kPa) for 20 minutes and a disinfection treatment of exposing the air filter medium to the environment for 100 minutes were performed in conforming to the conditions described in "JIS Z2801 Antibacterial Products—Test for antibacterial activity and efficacy, 5.3 Disinfection Method, b) High-Pressure Steam Disinfection". The disinfection treatment by an autoclave treatment was performed only on the air filter medium of Example 1. However, since the components of the air filter medium are the same, it is believed that the air filter media of Examples 2 and 3 also show the same tendency.

In the disinfection treatment by a high-temperature air heating treatment, a disinfection treatment of exposing, for 100 minutes, the air filter medium to a thermostatic chamber filled with dry air at a temperature of 120° C. was performed. The disinfection treatment by a high-temperature air heating treatment was performed only on the air filter medium of Example 1. However, since the components of the air filter medium are the same, it is believed that the air filter media of Examples 2 and 3 also show the same tendency.

In the disinfection treatment by an autoclave treatment in a state of being sealed in an aluminum bag, a disinfection treatment of exposing, for 100 minutes, the air filter medium sealed in an aluminum bag to a high-temperature water vapor environment at 121° C. (corresponding to a gauge pressure of 103 kPa) was performed. The disinfection treatment by an autoclave treatment in a state of being sealed in an aluminum bag was performed only on the air filter medium of Example 1. However, since the components of the air filter medium are the same, it is believed that the air filter media of Examples 2 and 3 also show the same tendency.

In the disinfection treatment by irradiation with ultraviolet rays, a disinfection treatment of irradiating the air filter medium with ultraviolet rays having a wavelength of 254 nm for 5 minutes and a disinfection treatment of irradiating the air filter medium with the ultraviolet rays for 30 minutes were performed.

In the disinfection treatment using a hydrogen peroxide solution, a disinfection treatment of immersing the air filter medium in a liquid whose concentration of the hydrogen peroxide solution was 3 w/v % for 10 minutes and a disinfection treatment of immersing the air filter medium in the liquid for 30 minutes were performed.

In the disinfection treatment using ozone, a disinfection treatment of exposing the air filter medium to an environment with an ozone concentration of 6 ppm for 66 hours was performed. The disinfection treatment using ozone was performed only on the air filter medium of Example 1. However, since the components of the air filter medium are the same, it is believed that the air filter media of Examples 2 and 3 also show the same tendency.

The physical properties measured in Examples 1 to 3 are as follows.

(Pressure Loss in Air Filter Medium)

The measurement sample of the air filter medium was set to a filter holder having a diameter of 100 mm. The pressure on the inlet side was increased using a compressor, and the flow rate of air passing through the air filter medium was adjusted to 5.3 cm/s using a velocimeter. The pressure loss at this time was measured using a differential pressure gauge.

(Collection Efficiency of NaCl Particles Having Particle Size of 0.1 μm and Permeability in Air Filter Medium)

NaCl particles generated with an atomizer in conformity to the NaCl aerosol generating method (pressurized atomizing method) in JIS B9928 Appendix 5 (specification) were classified using an electrostatic classifier (manufactured by TSI Incorporated) into particles having a particle size of 0.1. The charge on the particles was neutralized using americium-241. Then, the flow rate at which the particles passed through the air filter medium was adjusted to 5.3 cm/s. The numbers of particles before and after passage through the filter medium serving as a measurement sample were determined using a particle counter (CNC manufactured by TSI Incorporated), and the collection efficiency was calculated from the following formula.

Permeability (%)=(CO/CI)×100
Collection efficiency (%)=100−permeability (%)
CO=Number of 0.1 μm NaCl particles on the downstream side of the measurement sample
CI=Number of 0.1 μm NaCl particles on the upstream side of the measurement sample (PF of NaCl particles having particle size of 0.1 μm in air filter medium)

With NaCl particles having a particle size of 0.1 PF was determined from the following formula using the pressure loss and collection efficiency (the collection efficiency of NaCl particles having a particle size of 0.1 μm) of the air filter medium.

PF={−log((100−collection efficiency (%))/100)}/(pressure loss (Pa)/1000)

(Coefficient of Variation (CV) of Pressure Loss in Air Filter Medium)

From a long air filter medium (650 mm in the width direction) wound in a roll shape, a portion having a length of about 5 m including the tip was drawn out. The air filter medium was divided into 25 sections each having 200 mm in the longitudinal direction of the air filter medium and into four sections each having 130 mm in the width direction except both ends to obtain 100 sections in a lattice manner. A filter holder having a diameter of 100 mm was used to measure the pressure loss at the 100 sections. The measurement of the pressure loss was performed by continuously measuring the pressure loss at a plurality of lattice sections while moving the filter medium in the longitudinal direction using a measuring apparatus equipped with five or more filter holders in the width direction of the filter medium. Then, the standard deviation was determined from the pressure loss distribution composed of the measured pressure losses. The determined standard deviation was divided by the average of the measured pressure losses in all the sections to determine a coefficient of variation (CV) (%).

(Dust-Holding Capacity of Polyalphaolefin Particles in Air Filter Medium: PHC)

The dust-holding capacity was evaluated by a pressure loss-increase test in which polyalphaolefin (PAO) particles (liquid particles) were passed through the filter medium. That is, the pressure loss given when air containing PAO particles was continuously passed through a sample filter medium having an effective filtration area of 50 cm² at a flow rate of 5.3 cm/s was measured over time using a differential pressure gauge to determine a dust-holding capacity (g/m²) that was a weight of PAO particles held in the filter medium per unit area of the filter medium when the pressure loss increased by 250 Pa. The PAO particles were PAO particles (number median diameter: 0.25 μm) generated with a Laskin nozzle, and the concentration of the PAO particles was set to about 1,000,000 to 6,000,000/cm³.

The physical properties of the air filter media of Examples 1 to 3 before and after each of the disinfection treatments are shown in Tables below.

In Tables, the pressure loss ratio indicates "Pressure loss after disinfection treatment (Pa)/Initial pressure loss (Pa)", the collection efficiency ratio indicates "Collection efficiency after disinfection treatment (%)/Initial collection efficiency (%)", the permeability ratio indicates "100−Collection efficiency after disinfection treatment (%)/100−Initial collection efficiency (%)", and the PF ratio indicates "PF after disinfection treatment/Initial PF".

TABLE 1

| | Initial pressure loss (Pa) | Pressure loss after disinfection treatment (Pa) | Pressure loss ratio | Initial collection efficiency (%) | Collection efficiency after disinfection treatment (%) | Collection efficiency ratio | Permeability ratio | Initial PF | PF after disinfection treatment | PF ratio |
|---|---|---|---|---|---|---|---|---|---|---|
| Surfactant | 48 | 48 | 1.00 | 93.4375 | 89.0625 | 1.0 | 1.7 | 24.6 | 20.0 | 0.8 |
| Alcohol | 50 | 52 | 1.04 | 94.3750 | 96.5625 | 1.0 | 0.6 | 25.0 | 28.1 | 1.1 |
| Sodium hypochlorite | 50 | 50 | 1.00 | 93.7500 | 97.6250 | 1.0 | 0.4 | 24.1 | 32.5 | 1.3 |
| Hypochlorous acid solution | 50 | 47 | 0.94 | 94.0625 | 97.0313 | 1.0 | 0.5 | 24.5 | 32.5 | 1.3 |
| 85° C. hot water (10 min) | 47 | 42 | 0.89 | 91.8750 | 90.3125 | 1.0 | 1.2 | 23.2 | 24.1 | 1.0 |
| 85° C. hot water (60 min) | 45 | 38 | 0.84 | 91.8750 | 90.6250 | 1.0 | 1.2 | 24.2 | 27.1 | 1.1 |
| Autoclave (20 min) | 50 | 42 | 0.84 | 95.5500 | 93.4000 | 1.0 | 1.5 | 26.9 | 28.1 | 1.0 |
| Autoclave (100 min) | 50 | 42 | 0.84 | 94.8300 | 92.5400 | 1.0 | 1.4 | 25.2 | 26.3 | 1.0 |
| High-temperature air heating treatment | 49 | 41 | 0.84 | 93.5000 | 92.9200 | 1.0 | 1.1 | 23.6 | 27.6 | 1.2 |
| Aluminum bag sealing | 50 | 42 | 0.84 | 95.2300 | 93.7000 | 1.0 | 1.3 | 24.0 | 26.5 | 1.1 |
| UV (5 min) | 47 | 48 | 1.02 | 91.2500 | 89.6875 | 1.0 | 1.2 | 22.5 | 20.6 | 0.9 |
| UV (30 min) | 51 | 45 | 0.88 | 90.6250 | 86.2500 | 1.0 | 1.5 | 20.2 | 19.1 | 0.9 |
| Hydrogen peroxide solution (10 min) | 49 | 44 | 0.90 | 90.9375 | 85.9375 | 0.9 | 1.6 | 21.3 | 19.4 | 0.9 |
| Hydrogen peroxide solution (30 min) | 46 | 45 | 0.98 | 89.3750 | 88.7500 | 1.0 | 1.1 | 21.2 | 21.1 | 1.0 |
| Ozone | 52 | 51 | 0.98 | 97.6400 | 97.0600 | 1.0 | 1.2 | 31.3 | 30.0 | 1.0 |

TABLE 2

| | Initial pressure loss (Pa) | Pressure loss after disinfection treatment (Pa) | Pressure loss ratio | Initial collection efficiency (%) | Collection efficiency after disinfection treatment (%) | Collection efficiency ratio | Permeability ratio | Initial PF | PF after disinfection treatment | PF ratio |
|---|---|---|---|---|---|---|---|---|---|---|
| Surfactant | 182 | 182 | 1.00 | 99.9891 | 99.9900 | 1.0 | 0.9 | 21.8 | 22.0 | 1.0 |
| Alcohol | 181 | 180 | 0.99 | 99.9918 | 99.9908 | 1.0 | 1.1 | 22.6 | 22.4 | 1.0 |
| Sodium hypochlorite | 188 | 183 | 0.98 | 99.9918 | 99.9973 | 1.0 | 0.3 | 21.7 | 25.0 | 1.1 |
| Hypochlorous acid solution | 195 | 191 | 0.98 | 99.9864 | 99.9942 | 1.0 | 0.4 | 19.8 | 22.2 | 1.1 |
| 85° C. hot water (10 min) | 156 | 160 | 1.03 | 99.9412 | 99.9265 | 1.0 | 1.3 | 20.7 | 19.6 | 1.0 |
| 85° C. hot water (60 min) | 167 | 162 | 0.96 | 99.9576 | 99.9541 | 1.0 | 1.1 | 20.2 | 20.6 | 1.0 |
| UV (5 min) | 183 | 181 | 0.99 | 99.9939 | 99.9889 | 1.0 | 1.8 | 23.0 | 21.8 | 0.9 |
| UV (30 min) | 183 | 184 | 1.00 | 99.9939 | 99.9857 | 1.0 | 2.3 | 23.0 | 20.9 | 0.9 |
| Hydrogen peroxide solution (10 min) | 183 | 180 | 0.98 | 99.9853 | 99.9840 | 1.0 | 1.1 | 20.9 | 21.1 | 1.0 |
| Hydrogen peroxide solution (30 min) | 183 | 186 | 1.01 | 99.9853 | 99.9869 | 1.0 | 0.9 | 20.9 | 20.9 | 1.0 |

TABLE 3

| | Initial pressure loss (Pa) | Pressure loss after disinfection treatment (Pa) | Pressure loss ratio | Initial collection efficiency (%) | Collection efficiency after disinfection treatment (%) | Collection efficiency ratio | Permeability ratio | Initial PF | PF after disinfection treatment | PF ratio |
|---|---|---|---|---|---|---|---|---|---|---|
| Surfactant | 91 | 91 | 1.00 | 99.0940 | 98.9917 | 1.0 | 1.1 | 22.0 | 21.5 | 1.0 |
| Alcohol | 91 | 90 | 0.99 | 99.2157 | 99.1596 | 1.0 | 1.1 | 22.8 | 22.6 | 1.0 |
| Sodium hypochlorite | 94 | 92 | 0.98 | 99.3915 | 99.2879 | 1.0 | 1.2 | 23.1 | 23.0 | 1.0 |
| Hypochlorous acid solution | 98 | 96 | 0.98 | 99.0442 | 98.8753 | 1.0 | 1.2 | 20.3 | 20.0 | 1.0 |
| 85° C. hot water (10 min) | 78 | 80 | 1.03 | 97.7524 | 97.4814 | 1.0 | 1.1 | 20.7 | 19.6 | 0.9 |
| 85° C. hot water (60 min) | 84 | 81 | 0.96 | 98.2081 | 97.9004 | 1.0 | 1.2 | 20.5 | 20.3 | 1.0 |
| UV (5 min) | 92 | 91 | 0.99 | 99.2566 | 99.0702 | 1.0 | 1.3 | 22.8 | 22.0 | 1.0 |
| UV (30 min) | 92 | 92 | 1.00 | 99.3179 | 98.9991 | 1.0 | 1.5 | 23.2 | 21.3 | 0.9 |
| Hydrogen peroxide solution (10 min) | 92 | 90 | 0.98 | 98.9514 | 98.7960 | 1.0 | 1.1 | 21.2 | 20.9 | 1.0 |
| Hydrogen peroxide solution (30 min) | 92 | 93 | 1.01 | 98.9737 | 98.9834 | 1.0 | 1.0 | 21.3 | 21.0 | 1.0 |

Comparative Example 1

For Comparative Example 1, the change in physical properties of an air filter medium not including a fluororesin porous membrane was measured before and after each of the disinfection treatment using a surfactant and the disinfection treatment using an alcohol.

In Comparative Example 1, a member of a commercially available electret PP melt-blown mask was used. The member of the mask had a thickness of 130 µm and a basis weight of 23 g/m². An air filter medium of Comparative Example 1 was obtained by stacking three of the members of the mask.

The change in physical properties of the air filter medium of Comparative Example 1 was measured before and after each of the disinfection treatment using a surfactant and the disinfection treatment using an alcohol in the same manner as in Examples 1 to 3.

When the air filter medium of Comparative Example 1 was subjected to the disinfection treatment using a surfactant, the initial pressure loss was 58 Pa, the pressure loss after the disinfection treatment was 54 Pa, and the pressure loss ratio was 0.93. The initial collection efficiency was 97.5161%, the collection efficiency after the disinfection treatment was 59.0323%, the collection efficiency ratio was 0.6, and the permeability ratio was 16.5. The initial PF was 27.7, the PF after the disinfection treatment was 7.2, and the PF ratio was 0.3.

When the air filter medium of Comparative Example 1 was subjected to the disinfection treatment using an alcohol, the initial pressure loss was 58 Pa, the pressure loss after the disinfection treatment was 54 Pa, and the pressure loss ratio was 0.93. The initial collection efficiency was 97.5161%, the collection efficiency after the disinfection treatment was 86.4516%, the collection efficiency ratio was 0.9, and the permeability ratio was 5.5. The initial PF was 27.7, the PF after the disinfection treatment was 16.1, and the PF ratio was 0.6.

Comparative Example 2

For Comparative Example 2, a disinfection treatment (20 minutes) by an autoclave treatment was performed using an N95 mask, which is a nanofiber composite filter medium, in the same manner as in Example 1.

For the mask of Comparative Example 2, the initial pressure loss was 57 Pa, the pressure loss after the disinfection treatment was 60 Pa, and the pressure loss ratio was 1.0. For the mask of Comparative Example 2, the initial collection efficiency was 99.25%, the collection efficiency after the disinfection treatment was 63.58%, the collection efficiency ratio was 0.6, and the permeability ratio was 48.8. For the mask of Comparative Example 2, the initial PF was 36.4, the PF after the disinfection treatment was 7.2, and the PF ratio was 0.2. The collection efficiency of the mask of Comparative Example 2 is believed to be considerably decreased because the charging effect is reduced by the autoclave treatment.

(Appendix)

The embodiments of the present disclosure have been described, but it should be understood that configurations and details can be modified in various ways without departing from the spirit and scope of the present disclosure as defined in the claims.

REFERENCE SIGNS LIST

1 air filter unit
2 base
2a opening
3 strap
20 pleated mask filter medium (pleated filter medium)
25 frame body
30 air filter medium
31 fluororesin porous membrane
32 air-permeable supporting member (supporting member)

CITATION LIST

Patent Literature

PTL 1: International Publication No. 2013/157647

The invention claimed is:

1. A mask comprising:
a base including an intermediate opening;
straps provided to the base; and
a pleated filter medium attached to the intermediate opening of the base, wherein
the pleated filter medium has a shape including a mountain fold portion and a valley fold portion,
the pleated filter medium, in a position attached to the intermediate opening of the base, comprises an area that is greater than or equal to 22 cm$^2$ and less than or equal to 61 cm$^2$ when viewed in the air flow direction,
a pleat interval is 2.0 mm or more and 4.5 mm or less,
the pleated filter medium has an air filter medium,
the air filter medium comprises a fluororesin porous membrane and a supporting member stacked on top of each other,
wherein a pressure loss of the fluororesin porous membrane, when air is passed at a flow rate of 5.3 cm/s, is 40 Pa or more and 80 Pa or less, and
the air filter medium has a total area of 200 cm$^2$ or more and 1300 cm$^2$ or less,
wherein a permeability ratio (permeability after disinfection treatment/permeability before disinfection treatment), which is a ratio of a permeability of the air filter medium after a disinfection treatment of the fluororesin porous membrane as determined using NaCl particles having a particle size of 0.1 μm to a permeability of the air filter medium before the disinfection treatment of the fluororesin porous membrane as determined using NaCl particles having a particle size of 0.1 μm, is 5.0 or less,
a pressure loss ratio (pressure loss after disinfection treatment/pressure loss before disinfection treatment), which is a ratio of a pressure loss of the air filter medium after the disinfection treatment of the fluororesin porous membrane as determined when air is passed at a flow rate of 5.3 cm/s to a pressure loss of the air filter medium before the disinfection treatment of the fluororesin porous membrane as determined when air is passed at a flow rate of 5.3 cm/s, is 0.83 or more and 1.15 or less,
the air filter medium before the disinfection treatment has a PF of 19 or more, the PF being determined from a formula: PF={−log ((100−collection efficiency (%))/100)}/(pressure loss (Pa)/1000) using the pressure loss and a collection efficiency determined using NaCl particles having a particle size of 0.1 μm, and
the air filter medium is reused after the disinfection treatment,
wherein regardless of whether the disinfection treatment is exposure to an alcohol, exposure to a surfactant, exposure to a chlorine-based bleaching agent, exposure to a hypochlorous acid solution, exposure to a hydrogen peroxide solution, exposure to a temperature environment of 75° C. or higher and 150° C. or lower, irradiation with ultraviolet rays, or exposure to ozone, the permeability ratio of the air filter medium is 5.0 or less and the pressure loss ratio of the air filter medium is 0.83 or more and 1.15 or less.

2. The mask according to claim 1,
wherein when a droplet of a mixed liquid of isopropyl alcohol and water at a volume ratio of 60:40 is allowed to stand for 30 seconds on a surface of the fluororesin porous membrane, the mixed liquid penetrates into the fluororesin porous membrane.

3. The mask according to claim 1,
wherein a dust-holding capacity of polyalphaolefin particles having a number median diameter of 0.25 μm is greater than or equal to 15.0 g/m$^2$ and less than or equal to 28 g/m$^2$, when air containing the polyalphaolefin particles is continuously passed through the air filter medium before the disinfection treatment at a flow rate of 5.3 cm/s and the pressure loss increases by 250 Pa.

4. The mask according to claim 1,
wherein the disinfection treatment is at least one of the exposure to an alcohol and the exposure to a surfactant.

5. The mask according to claim 1,
wherein the supporting member includes, as a main component, any of polyethylene terephthalate, polyethylene, polypropylene, and a composite material of the foregoing.

6. The mask according to claim 1,
wherein the fluororesin porous membrane includes a fibrillatable polytetrafluoroethylene, a non-fibrillatable non-melt-fabricable component, and a non-fibrillatable melt-fabricable component having a melting point of lower than 320° C.

7. The mask according to claim 1,
wherein the fluororesin porous membrane includes a modified polytetrafluoroethylene.

8. A method for regenerating an air filter medium of a mask, the method comprising:
preparing the mask of claim 1; and
subjecting the fluororesin porous membrane of the mask of claim 1 to a disinfection treatment.

9. The mask according to claim 2,
wherein a dust-holding capacity of polyalphaolefin particles having a number median diameter of 0.25 μm is greater than or equal to 15.0 g/m$^2$ and less than or equal to 28 g/m$^2$, when air containing the polyalphaolefin particles is continuously passed through the air filter medium before the disinfection treatment at a flow rate of 5.3 cm/s and the pressure loss increases by 250 Pa.

10. The mask according to claim 2,
wherein the disinfection treatment is at least one of exposure to an alcohol, exposure to a surfactant, exposure to a chlorine-based bleaching agent, exposure to a hypochlorous acid solution, exposure to a hydrogen peroxide solution, exposure to a temperature environment of 75° C. or higher and 150° C. or lower, irradiation with ultraviolet rays, and exposure to ozone.

11. The mask according to claim 1,
wherein the disinfection treatment is at least one of exposure to an alcohol, exposure to a surfactant, exposure to a chlorine-based bleaching agent, exposure to a hypochlorous acid solution, exposure to a hydrogen peroxide solution, exposure to a temperature environment of 75° C. or higher and 150° C. or lower, irradiation with ultraviolet rays, and exposure to ozone.

* * * * *